US007297856B2

(12) United States Patent
Sitrick

(10) Patent No.: US 7,297,856 B2
(45) Date of Patent: Nov. 20, 2007

(54) SYSTEM AND METHODOLOGY FOR COORDINATING MUSICAL COMMUNICATION AND DISPLAY

(76) Inventor: David H. Sitrick, 820 Burchell, Highland Park, IL (US) 60035

( * ) Notice: Subject to any disclaimer, the term of this patent is extended or adjusted under 35 U.S.C. 154(b) by 70 days.

(21) Appl. No.: 10/261,061

(22) Filed: Sep. 30, 2002

(65) Prior Publication Data
US 2003/0024375 A1    Feb. 6, 2003

Related U.S. Application Data

(60) Continuation of application No. 09/492,218, filed on Jan. 27, 2000, now Pat. No. 7,157,638, which is a division of application No. 09/039,952, filed on Mar. 16, 1998, now Pat. No. 6,084,168, and a continuation of application No. 08/677,469, which is a continuation-in-part of application No. 08/677,469, filed on Jul. 10, 1996, now Pat. No. 5,728,960.

(51) Int. Cl.
*G09B 15/00* (2006.01)
*G09B 15/02* (2006.01)
*G10H 1/00* (2006.01)

(52) U.S. Cl. .................... 84/477 R; 84/470 R; 84/478; 84/483.2

(58) Field of Classification Search .......... 84/600–602, 84/609–610, 615–618, 634, 645, 649–650, 84/653–656, 666, 477 R, 478, 483.1, 483.2; 434/307
See application file for complete search history.

(56) References Cited
U.S. PATENT DOCUMENTS
4,350,070 A    9/1982 Bahu
(Continued)

FOREIGN PATENT DOCUMENTS
DE    3839361    5/1990
(Continued)

OTHER PUBLICATIONS
MOODS (Music Object Oriented Distributed System), (started 1994, p. 15) (1995 and early 1996, p. 15).*
(Continued)

*Primary Examiner*—Marlon Fletcher
(74) *Attorney, Agent, or Firm*—Sitrick & Sitrick

(57) ABSTRACT

A musical workstation system produces a display presentation in one of a musical composition responsive to musical composition data and responsive to one or both of input variables and a selected operating mode. The system is comprised of (1) means to provide the musical composition data (such as local storage (ROM, RAM, CD-ROM, hard disk etc.), or via a communications interface to an external device (such as another music workstation, a master controller, a computer), a memory, a selection subsystem, a controller, and a display subsystem. The memory selectively stores the received original musical compositions. The selection subsystem determines a selected operating mode and display format. The controller, responsive to the selection subsystem, provides means for selectively controlling the storing of the musical composition data in memory and selectively processing (e.g. altering) the stored musical composition data responsive to the selected operating mode and the input variables to produce a particular one of a plurality of processed results, such as external communications, operating, mode, transformation to derivative musical compositions, etc. The music workstation can coordinate communications, or be a slave device, with one or more external devices, such as other music workstations, a master workstation, a controller, etc. The display system provides for selection of original compositions, creation of derivative compositions, distribution of compositions, monitoring of each performer's performance, group virtual performances, and also allows for local and distributed retrieval and editing of musical compositions.

41 Claims, 17 Drawing Sheets

U.S. PATENT DOCUMENTS

| | | | |
|---|---|---|---|
| 4,976,182 | A | 12/1990 | Obuchi et al. |
| 5,153,829 | A | 10/1992 | Furuya et al. |
| 5,176,520 | A * | 1/1993 | Hamilton .................... 434/350 |
| 5,315,911 | A | 5/1994 | Ochi |
| 5,400,687 | A | 3/1995 | Ishii |
| 5,488,196 | A | 1/1996 | Zimmerman et al. |
| 5,521,323 | A | 5/1996 | Paulson et al. |
| 5,590,282 | A | 12/1996 | Clynes |
| 5,604,322 | A | 2/1997 | Kikuchi |
| 5,665,927 | A | 9/1997 | Taki et al. |
| 5,689,077 | A | 11/1997 | Jasinski |
| 5,728,962 | A | 3/1998 | Goede |
| 5,760,323 | A | 6/1998 | Romero et al. |
| 5,952,597 | A | 9/1999 | Weinstock et al. |
| 6,348,648 | B1 * | 2/2002 | Connick, Jr. .............. 84/477 R |

FOREIGN PATENT DOCUMENTS

| | | |
|---|---|---|
| DE | 4200673 | 7/1993 |
| FR | 2670599 | 6/1992 |
| FR | 2762130 | 10/1998 |
| GB | 2279493 | 1/1995 |
| GB | 2293915 | 4/1996 |
| JP | 60-253082 | 12/1985 |
| JP | 01-099169 | 4/1989 |
| JP | 01-113785 | 5/1989 |
| JP | 05-073042 | 3/1993 |
| JP | 06-004071 | 1/1994 |
| JP | 06-274158 | 9/1994 |
| JP | 07-020858 | 1/1995 |
| JP | 08-115081 | 5/1996 |
| JP | 08-123416 | 5/1996 |
| JP | 09-034446 | 2/1997 |
| JP | 09-097057 | 4/1997 |
| JP | 09-114453 | 5/1997 |
| JP | 09-244524 | 9/1997 |
| WO | WO 94/10680 | 5/1994 |

OTHER PUBLICATIONS

MOODS (newly cited reference pp. (26), showing earlier dates than present application).*

Graefe, Christopher et al., "Designing the muse: A Digital Music Stand for the Symphony Musician," Apr. 13-18, 1996, pp. 436-441 and 521-524, Design Breifings, ACM/SIGCHI Conference on Human Factors in Computing Systems, Vancouver, British Columbia, Canada.

"FINALE: The art of Music Notation," 1992, vol. 2 Encyclopedia, 3.0 for Macintosh, 308 pages, Coda Music Software, Eden Prairie, Minnesota.

Ditlow et al., "Paging of Display Screen Images Using Footswitch and Digital Interface," IBM Technical Disclosure Bulletin, Jan. 1, 1989, pp. 252-254.

Dasna, Orya et al., "Muse: Digital Music Stand for Symphony Musicians," Interactions Design Awards, May/Jun. 1996, pp. 27-35.

"Computer Graphics Visual Effects for Terminator 2: Judgement Day;" Siggraph 93: Course Notes 20: Computer Graphics in Visual Effects, 20th International Conference on Computer Graphics and Interactive Techniques; Aug. 1993; sec. 3, pp. 1-15; University of California; San Diego, CA, USA.

Goldman, Clint; "Abel, Ketchum Create a Sexy Robot for Can Council;" *Back Stage*; Jan. 25, 1985; pp. 1, 10.

Christopher, Abigail; "Siggraph '85, Part II: The Making of 'Brilliance,' Achieving the Impossible in Special Effects;" *Computer Graphics World*; Jul. 1985; pp. 32-34 and 36; PennWell.

"The Story of Waldo C. Graphic;" 3-D Character Animation by Computer, Course #4; ACM Siggraph 89; Jul. 1989; pp. 65-79; Boston, MA, USA.

Tremaine, Howard M.; "Audio Cyclopedia;" 1973; pp. 864-871; Second Edition; ISBN: 0-672-20675-7; Howard W. Sams & Co., Inc.; Indianapolis, IN, USA.

Strutt, Lionel; "Automated Dialog Replacement Using the Computer;" *The BKSTS Journal*; Mar. 1981; pp. 196-198; vol. 63; British Kinematograph Sound & Television Society.

Bloom, P. J.; Marshall, G. D.; "A Digital Processing System for Automatic Dialogue Post-Synchronization;" *SMPTE Journal*: Jun. 1984; pp. 566-569.

Williams, Lance; "Performance-Driven Facial Animation;" *Computer Graphics*; Aug. 1990; pp. 235-242; vol. 24; No. 4.; ACM-0-89791-344-2/90/008/0235.

Chadwick, John E.; Haumann, David R.; Parent, Richard E.; "Layered Construction for Deformable Animated Characters;" *Computer Graphics*; Jul. 1989; pp. 243-252; vol. 23; No. 3.; ACM-0-89791-312-4/89/007/0243.

Marshall, G. D.; Bloom, P. J.; "Wordfit: a Digital Audio Signal Processing System for Automatic Time Alignment of Post-Synched Dialog;" *The BKSTS Journal*; Apr. 1984; 4 pgs. , beginning on p. 158; British Kinematograph Sound & Television Society.

Siggraph 1990: Course Notes 17: Computer Graphics in Visual Effects, 17th International Conference on Computer Graphics and Interactive Techniques; Aug. 1990; University of California; San Diego, CA, USA.

"Wordfit System for Automatic Dialogue Synchronization," *Digital Audio Research*, 1985, Rev. Jun. 1985, Digital Audio Research Limited, London, England.

Mellor, David; "Digital Audio Recorder;" *Sound on Sound*; Apr. 1990.

Mellor, David; "WordFit Automatic Dialogue Synchronization;" *Audio Media*; Mar. 1991.

"Wordfit User Manual;" 1985; pjb: usmlitle-v1.1; Digital Audio Research Limited; London, England.

Blake, Larry; "Digital Sound for Motion Pictures, Including Production Recording and Random-Access;" *Recording Engineer Producer*; Oct. 1985; pp. 122, 134-136; vol. 16, No. 5.

* cited by examiner

SYSTEM AND METHODOLOGY FOR COORDINATING MUSICAL COMMUNICATION AND DISPLAY

RELATED APPLICATIONS

This application is a continuation of Ser. No. 08/677,469, now U.S. Pat. No. 5,728,960 filed Jul. 10, 1996, by virtue of this application being a continuation application of application Ser. No. 09/492,218 filed Jan. 27, 2000, now U.S. Pat. No. 7,157,638 which claims priority as a divisional of application Ser. No. 09/039,952 now U.S. Pat. No. 6,084,168 filed Mar. 16, 1998, which claims priority as a continuation-in-part of application Ser. No. 08/677,469 now U.S. Pat. No. 5,728,960 filed Jul. 10, 1996.

FEDERALLY SPONSORED RESEARCH OR DEVELOPMENT

Not Applicable.

BACKGROUND OF THE INVENTION

The present invention relates to the field of music. More particularly, the present invention relates to a display system for displaying musical compositions, either batch or in a real time environment, and processing and communicating user performances.

Music is usually only available in the written form for one (or a fixed set of) performer/instrument types in a fixed key. Adaptations or variations of musical arrangements are complex and costly. Remotely located musicians are unable to effectively practice together. Small communities each with only a few musicians are limited to practicing with the few musicians they have.

Performers of music have many inconveniences to deal with. One such inconvenience deals with the composing, distribution, and utilization of music display presentation, traditionally sheet music. Another major problem relates to the inconvenience of scheduling and physical gathering of multiple musicians (including instrumentalists and vocalists), which when combined in their performance provide a musical ensemble or orchestra. For example, high school band practice requires that all students be available to practice at the same time at the same place (i.e., the school music room). However, this creates difficulties in that many students have other activities which conflict with band practice which is then incomplete. Additionally, when composing, musicians often will come up with an idea when physically not with another musician.

Musicians typically work from sheet music. When composing, they write the notes down on paper that has a number of staffs. If the musician transposes a composition from one key to another, the notes are also written down on the staff paper. The scores for different instruments must also be generated and written down. All of the scores are then copied for distribution to other musicians and/or music stores.

When performing, the sheet music must be found, for all parts to be played, manually distributed, manually set-up, manually handled (turn pages, etc.). There is also an unfulfilled need for quick access to a more comprehensive database of music for the performing musician, whether he is solo or part of an orchestra. Also, musicians often perform audience requests, and require access to sheet music for requested songs. Presently, there are various combinations of songs compiled in "FAKE" Books, usually by category (e.g., rock, country, blues, big band, etc.). This is only of limited help. Furthermore, the use of paper sheet music is cumbersome and inconvenient; pages often get damaged or lost, and indexed access is poor and slow.

This method of composing and distributing music is inadequate when the music is used by a band or orchestra that requires hundreds of copies. If the conductor desires the piece to be played in a different key or certain sections of the music edited to suit the conductor's tastes, the composition must be rewritten and the new transposed copy distributed to the band or orchestra. This is a very costly, time-consuming, and laborious task if the orchestra has a large number of members.

Additionally, if the composition does not have a part for a certain instrument, the conductor must generate the required part from the original composition. After the score for the required instruments has been generated, the parts must be copied and distributed to the individual musicians. This, again, is a very costly and laborious task if the band has a large number of musicians requiring different parts. There is a need, therefore, for a more efficient way of transposing, editing, and distributing music scores.

Over the past many years, great advances have been made in the electronic input, storage, and display of music. Electronic bands and orchestras are constructed using computers and MIDI equipment. Programs exist for personal computers (e.g., Apple Macintosh, DOS, and Windows machines) for an individual to use the computer for transposing music, composing music. Programs also exists for automatically inputting music from direct performance (such as directly from a keyboard, electronically through MIDI converters (such as for string instruments), via pickups and microphones, and sequencers, tone generators, etc.) To generate digital data and/or music notation.

Musicians often perform both pre-planned and ad hoc compositions during the course of a performance. It would therefore be desirable to have the ability to access a large database of musical compositions on demand. It would also be desirable to permit communication and synchronization of a music presentation to multiple performing musicians who are playing together. It would also be desirable for a performing musician to have his or her performance of the music input onto an individual music workstation, and stored, and analyzed by an automated system, and/or communicated to one or more other networked (remote) individual music workstations.

SUMMARY OF THE INVENTION

The present invention encompasses a musical presentation system. In one embodiment, the system enables one or more users to select a musical composition, and perform the selected musical composition at each of a plurality of individual music stands, independently capturing the performance of a respective user and communicating the individuals performance data to a master workstation (which can be standalone or one of the networked individual workstations), which combines the plurality of individual workstation performance data into a composited combined performance data and communicates said combined performance data back to all of the individual workstations wherein the individual workstations provide for audio (and/or vide and/or audiovisual) output representative of the combined performance data (which represents the musical performance inputs for all of the communicating plurality of individual workstations). The time between the users performing the segment of music and that same user hearing the audio presentation of the combined data is less than the time interval detectable by a human being. In a preferred embodiment, the plurality of individual workstations collectively provide for synchronized display presentation of a selected music composition's presentation, and provide for output of individual performance data representative of the musical performance of the user corresponding to the display presentation. Timing-synchronization is also provided for to permit synchronization of the display presentation of the plurality of individual workstations, and for synchronization by the master workstation of the plurality of individual performance data to construct the combined performance data. In one embodiment, the master workstation generates a synchronization signal that is communicated to all the individual workstations from the master workstation. Other synchronization structures are also equally acceptable, such as embedding timing synchronization data within the individual performance data.

In another embodiment of the present invention, a musical presentation system enables a user to select from one or a variety of musical compositions, control the adaptation of the selected composition, and distribute the edited version efficiently in a paperless environment. The system and process of the present invention also provides means for receiving music from a number of sources. The user selects the desired musical composition from the source. The desired composition is displayed and/or stored in the system's memory for further processing by the system prior to display and/or distribution.

In accordance with one aspect of the present invention, each of the music workstations in an intelligent music composition communication architecture provides for musical information, to be distributed for a video or visual presentation of music in a userfriendly notation, and/or provides an audio presentation that can be selectively tracked and synched to the video presentation and/or tracks and synchs the displayed video presentation to a live performance, etc.

In still another embodiment, the system includes a user input device enabling selection of the musical composition, and optionally, permitting any user specified editing desired in the composition, and, in a preferred embodiment, permitting user selection of parameters (such as the musical key in which the composition is to be played). The user can then instruct the system to transmit the newly generated music scores to one or more display subsystems (such as CRT's, LED's, LCD's, etc.), or to other systems. In the preferred embodiment, these displays take the form of liquid crystal displays built into music stand based systems, also referred to herein as display stations or workstations.

This invention also relates to a musical presentation and/or communication system, and more particularly, to a system which permits musicians to view the score or other audiovisual or visual-only presentations of a musical composition, to permit the musician/user to perform the musical composition on the instrument of choice, as selected by the user, and in the key of choice, as selected by the user.

In accordance with one aspect of the present invention, one or more music workstations are provided, consisting of a video presentation means, such as a display screen (CRT, LCD, LED, Heads Up Display (HUD) etc.) in conjunction with a computer-based system which in one embodiment stores a database of songs and music which can be utilized by the musician/user of the system.

In accordance with yet another embodiment of the present invention, there are provided numerous music workstations, such that different or similar instruments can each select a respective portion of a song to be performed, such that all musicians performing the same musical piece are provided musical presentation or representation in the same key to permit the playing of the music together. In a preferred embodiment, the system is capable of locking into a particular key (and/or instrument type) responsive to input variables (such as can be provided via an input device such as a microphone or keyboard, or voice recognition, or camera) to determine the desired key to be played in. In a preferred embodiment, the user can select an auto-transpose mode where all music is thereafter automatically transposed. The transposition can take place at a master workstation and then be communicated to the individual workstations. In one of the illustrated embodiments, the transposition of the music takes place locally at the music workstation which provides local intelligence. An original musical composition, such as selected from a stored database of a library of music is then transposed in accordance with transposition rules. Many options are available, and various transposition rules and methods are well known and documented and in use on numerous products, such as keyboards which have built-in capabilities for transposition of music, as well as computer software which provides for transposition and notation of music.

In accordance with an alternate embodiment, the user connects to a remote database via wireless or wired communication to permit downloading to the local computer of those musical pieces which the user has selected for performance. The user music terminal, or the central computer, can receive the transposed (derivative composition) version or can receive an unmodified (original musical composition) version, which it can then display and/or convert and transpose music as necessary for each instrument and/or key.

In another alternate embodiment, a user can prearrange for downloading of selected compositions via a remote connection service, where the music user terminal can include a non-volatile storage memory permitting the storage and replay of all requested compositions. Alternatively, a central server can be provided, where multiple music end terminals share a single central controller computer, or each have their own computers which share in a central server computer or with each other in a distributed architecture.

Alternatively, a non-volatile storage structure, such as a CD-ROM, can contain a database of music which can be selected from for transposition in accordance with the present invention.

The present invention provides a music communication architecture and methodology that permits the synchronizing of music display presentations for multiple display stations performing the same musical composition. Bands and orchestras can be constructed using multiple independent music workstation display whether at one site or remotely distributed. In one embodiment, the music display presentations provides one or more of the display of the musical composition, performance by the user, and the output presentation for the combination of the individual performance data for a plurality of individual workstations. In one embodiment, a master workstation is responsive to the individual performance data from the plurality of individual performance data and provides means for synchronizing and compositing the individual performance data from the plurality of the individual workstations, and providing a presentation output (audio and/or video) comprising the combined virtual performance.

It is a further object of the present invention to permit the comparison of a performer's performance parameters, such as parameter signals obtained via a microphone and/or camera, of the performing artist's performance or execution as compared to the stored and displayed music. The comparison includes the pitch, timing, volume, and tempo etc. of the music (such as through audio recognition) and critique the artist's physical movements (e.g., proper finger position, etc.) through visual recognition. In a preferred embodiment, the music workstation system provides the performer and/or a conductor with a presentation performance feedback indicating the quality of the performance as compared to the stored or displayed music, such as any errors, where they occurred, etc.

It is a further object of the present invention to provide a system whereby any displayed music can be transposed (e.g., to a different key, or converted to include different or additional different instruments and voices than that in which the sheet music is originally displayed).

It is a further object of the present invention to provide automated modes of intelligent operation of the music workstations, and to provide responsiveness to multiple forms of user input.

These and other aspects and attributes of the present invention will be discussed with reference to the following drawings and accompanying specification.

DETAILED DESCRIPTION OF THE PREFERRED EMBODIMENT

Figure 1A:
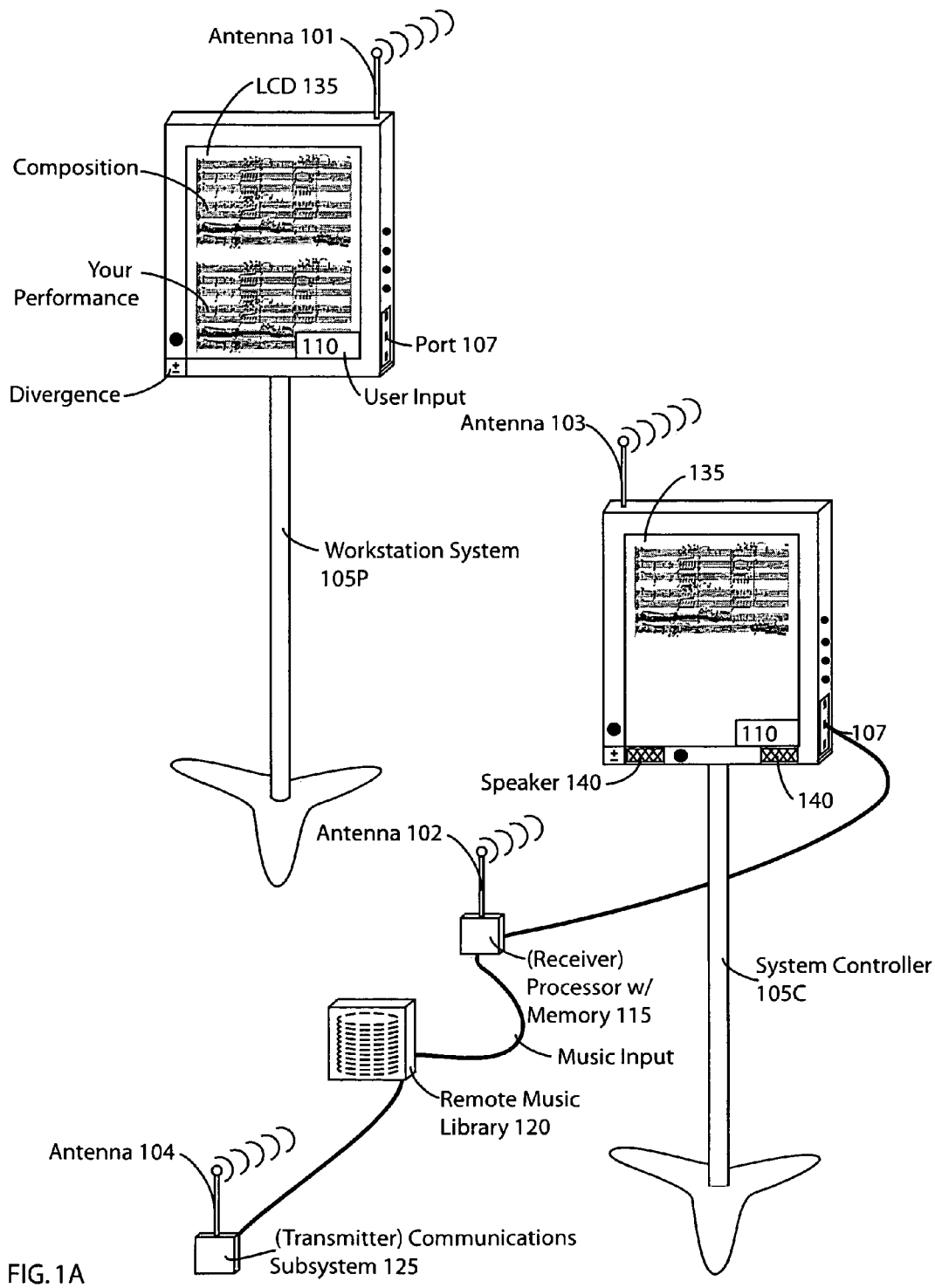
FIGS. 1A and 1B show a music presentation system in accordance with the present invention.

While this invention is susceptible of embodiment in many different forms, there is shown in the drawings, and will be described herein in detail, specific embodiments thereof with the understanding that the present disclosure is to be considered as an exemplification of the principles of the invention and is not intended to limit the invention to the specific embodiments illustrated.

In accordance with the teachings of the present invention, a system and methodology are provided for music presentation and communication. Musical compositions can be input to the present invention from any one or more of multiple sources, such as from prestored score images, live microphone, direct input from musical instruments or vocal direct performances, scanning in of existing printed score images (optically character recognized), cameras, visuals, etc. These inputs by the system are used in the selective storage, composition, communication, and presentation of the musical system of the present invention. The system can generate additional material automatically, or permit a user to modify, communicate, display and/or reproduce the musical compositions.

Modification can be performed on rhythm, primary key, individual notes, chords, etc. The vast store of musical information stored in digital notation format and/or any video format, can be broadcast (analog or digital) to a local music workstation or a master controller, which can also be a local workstation. The master controller can be a stand alone unit, or act as a server as well as its own stand alone unit, or simply as a server to a plurality of other stand alone units. However, in the minimal configuration, only a single musical user station is needed.

In one preferred embodiment, the workstation is provided as a music stand where the display presentation is a liquid crystal display (LCD). The LCD that can provide monochrome, gray scale or high quality color displays, depending on design and cost constraints and desires. Other display types can also be used. A touch-screen input can provide for simplified and adaptive user input selections. An optional built-in metronome function can also be provided for display presentation audio and/or video. A subsystem can also be optionally provided to permit the music to be audibly reproduced at the workstation through a speaker or headphone jack or other output.

It is well known in the art to convert user analog audio input into a digital format, ranging from straight Analog to Digital (e.g., A/D) conversion to processed data conversion to encoded digital music data, such as MIDI. Examples of MIDI include guitar input or other stringed instrument input through microphones or directly to MIDI-converters, or voice/non-pickup instruments through microphone converted to MIDI-input, or keyboard MIDI-input. Such input systems are commercially available from numerous companies for numerous types of interfaces at numerous interface levels. Similarly, numerous A/D converter subsystems are commercially available at chip and board solution levels (such as from Analog Devices Corporation and from Mattrox Systems).

In accordance with one aspect of the present invention, the multi-dimensional music transformation system of the present invention also enables a user to select one or more musical compositions from a larger database from a plurality of musical compositions. The database can be stored locally within the workstation, on site, or remotely stored and transmitted to the user (such as over cable, wire, telephone lines, wireless (such as radio frequencies)). The user can also optionally edit the selected score of the composition (such as changing the key and/or any note and/or timing, etc.) to suit his or her taste. The score (altered (the derivative composition) or not (the original composition)) can then be transmitted to one or more displays such as liquid crystal or CRTs in the music stands of the band or orchestra. The present invention, therefore, provides an efficient, paperless solution to communicating, presenting (displaying), and optionally one or more of transposing, editing, inputting, comparative testing-teaching, conducting, and disseminating music to one display or a large number of displays. Each display can have the same, or a different, unique, customized presentation of music notation as appropriate per selection, responsive to a set-up by a system, automatically per predefined parameters, and/or to user input. The score can also be printed out if a hard copy is desired.

As illustrated in FIG. 1, the music is stored, such as on a large hard drive or CD ROM jukebox, in a digital format as a music library (120). The music library (120) is coupled to a processor subsystem (115). Coupling can be wireless or cabled such as through a shielded cable, fiber optic conductor, switched connection (such as via phone lines), local, or remote. The processor (115) has the local storage capacity (e.g., semi-conductor memory, disk storage, etc.) to hold the digitized version of the music composition transmitted to it on request from the library (120). The music library can be local or proximately remote from the rest of the system.

In a wireless embodiment, the music library (120) is coupled to a communications subsystem (such as a radio frequency transmitter) (125) that transmits the contents of requested compositions from the remote music library (120) to the processor (115) through the antenna (104) of the transmitter. The antenna (102) at the receiver picks up the transmitted signal and the receiver conveys it to the processor (115). This embodiment enables the music library (120) to be remote and located at a great distance from the requesting site. The communications subsystem (125) can be a transceiver for bidirectional wireless communication, or a transmitter for one-way wireless communication (such as where the requests are otherwise communicated to the music library subsystem (120), such as via a wired connection).

As illustrated in FIG. 1A, a system controller, in the form of a music stand (105C) with a liquid crystal display, is used by an operator (e.g., performer, conductor, etc.) to select one or more musical compositions. FIG. 1A illustrates two types of music workstations stands. The workstation stand (105C) provides certain optional features for a more full-featured stand, including as illustrated, speakers (140) both wireless and wired communications capability, and as illustrated, shows the processor with memory (115) as an external separate component. The music stand (105P) shows the integration of the processor and memory into the music stand itself, and also shows both wireless (antenna (101)) and wired connection (port (107)) to permit network communication. Alternatively, the conductor stand (105C) could have all or part of the features integrated into the music stand (105C). Depending on the function for which the music workstation stand will be used, some or all of the features can be provided for that stand to minimize costs or optimize versatility. For example, in one situation, only the teacher or conductor needs the full-featured, full-powered music workstation. In that case, the performers or students do not have a full-feature workstation, but rather a scaled-down version of the workstation stand. In the preferred embodiment, a user input device (110) (such as a touch screen, microphone, keyboard, switches, voice recognition system, visual recognition system, etc.) is coupled to the processor in a wired (such as over a cable or fiber optic link) or wireless (such as over an RF link or infrared link) manner for workstation stand (105C), or directly to the processor, where it is built into the system controller as workstation (105P). The user can select an original musical composition from the touch screen of the liquid crystal display (135). The processor responds by storing that composition in the memory (115) of the local workstation of the user as requested.

Using the touch sensitive LCD (135), the user can now create a derivative musical composition. The touch sensitive LCD allows the user to enter the musical key in which the original composition will be played, edit any notes desired, and select the instruments and parts that will be playing the composition. The composition as originally composed, and the derivative or modified composition can be played back to the user over speakers (140) so that he or she may listen (e.g., such as to observe how the changes will sound) while optionally permitting simultaneous viewing of the score on the presentation visual display. Once the score has been designated (e.g., selected, edited, etc.) to the users (e.g., conductor's) taste, the appropriate portions (e.g., by musical instrument) of the scores can then be transmitted for (optional storage and) display to the respective associated individual music workstation stands of the band members.

In a preferred embodiment, each stand has an input device (110) that permits the user of the stand to select which instrument will be using the stand. (As discussed above, this input device can take the form of a touch sensitive screen or a number of buttons or switches or voice or audio recognition, etc.)

In the preferred embodiment, each individual music workstation stand (105) can be directly and/or remotely programmed to addressably receive (and optionally to locally convert) and display the music score that is intended for the respective instrument type (user type) that will be using (is associated with) the stand. As an example, the user of the stand (or a conductor) can input their selection of saxophone into the user input device (110) of the workstation stand (105C), to program that workstation stand (105C) only to receive the musical score for the saxophone (see FIG. 3). Then, the musical scores for all selected parts can be independently broadcast to all connected workstation stands, with each individual workstation stand individually distinguishing and accepting only its part. Alternatively, each workstation stand can be individually addressed for separate broadcast reception of its own respective selected part. Additionally, the user of the stand can program the user input to select a musical part of a selected musical composition (e.g., saxophone first chair) and receive only the musical score intended for that chair. This same procedure can be followed for other instruments within the band or orchestra. Alternatively, a single music composition can be broadcast to all workstations, where each workstation has local intelligence (processing and storage) to permit local conversion for display at each workstation for the selected instrument for each workstation.

For wireless communications, the individual music workstation stands (105) are comprised of receivers (or transceivers where bidirectional communication is desired) and antennas (101, 103) for receiving (or transceiving) the radio frequency information from (and to) the master workstation (such as for the conductor). The music stand also has a display (such as an LCD (135)) for displaying the musical score intended for that stand.

Figure 1B:
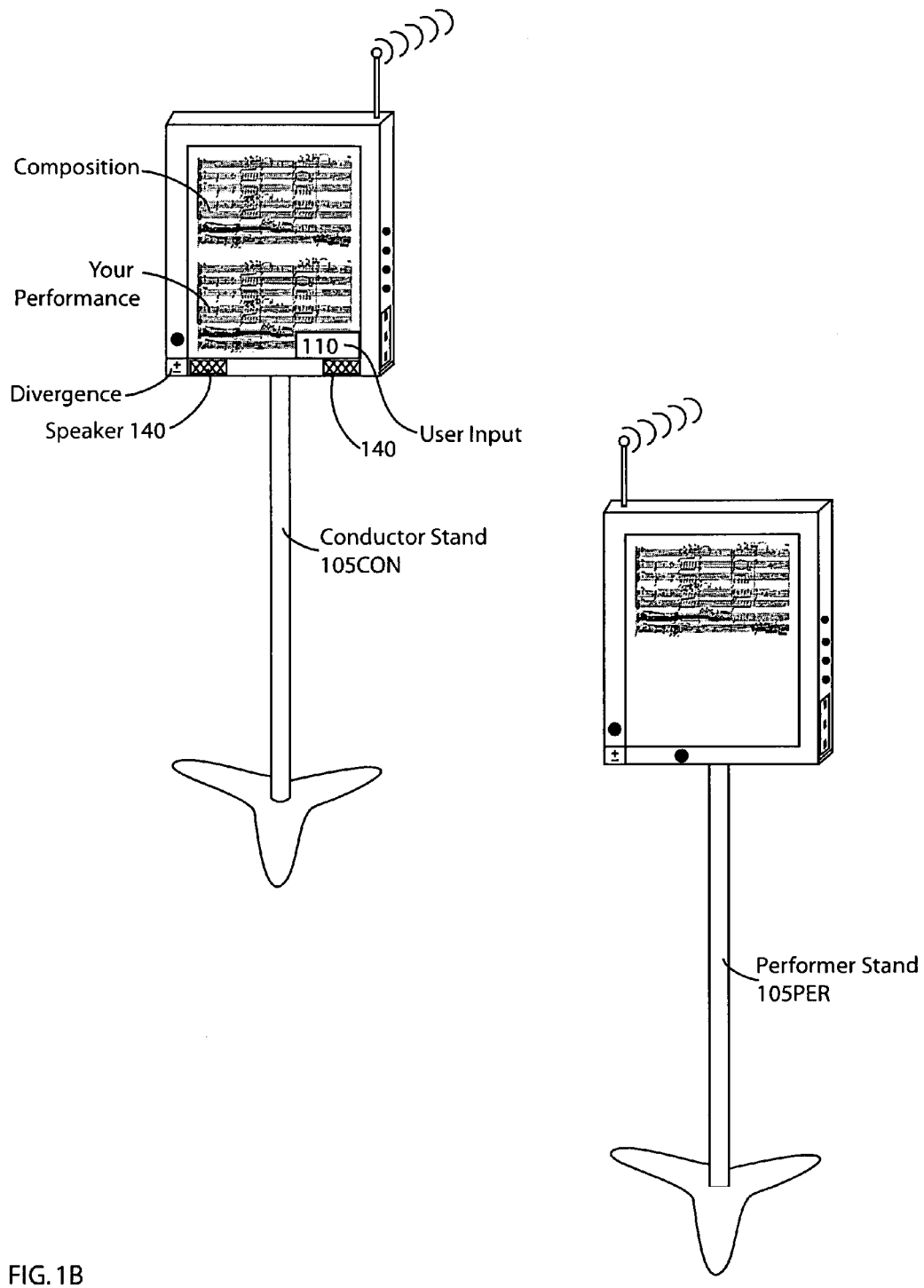

Referring to FIG. 1B, the music workstation stands can either be identical or broken down into conductor stands and performer stands. A conductor stand (105CON) may have more functions and control than a performer stand (105PER). A performer stand (105PER) might only have the ability to receive and display musical scores, whereas the conductor stand (105CON) has the ability to select the musical score, change the key of the musical composition, and perform other tasks only a conductor would be permitted or required to do.

In one embodiment, an RF antenna for the stand (105) can be built into the stand itself. Alternatively, instead of using RF, the performer's stand can be linked to the main (e.g., conductor's) stand using infrared, fiber optic cable, shielded cable, or other data transmission technologies. As discussed above, the communications link can be bidirectional, such as to facilitate requests and responses to facilitate the feedback of performance parameters or such that any workstation can be a master or slave, or used in combinations.

Figure 2A:
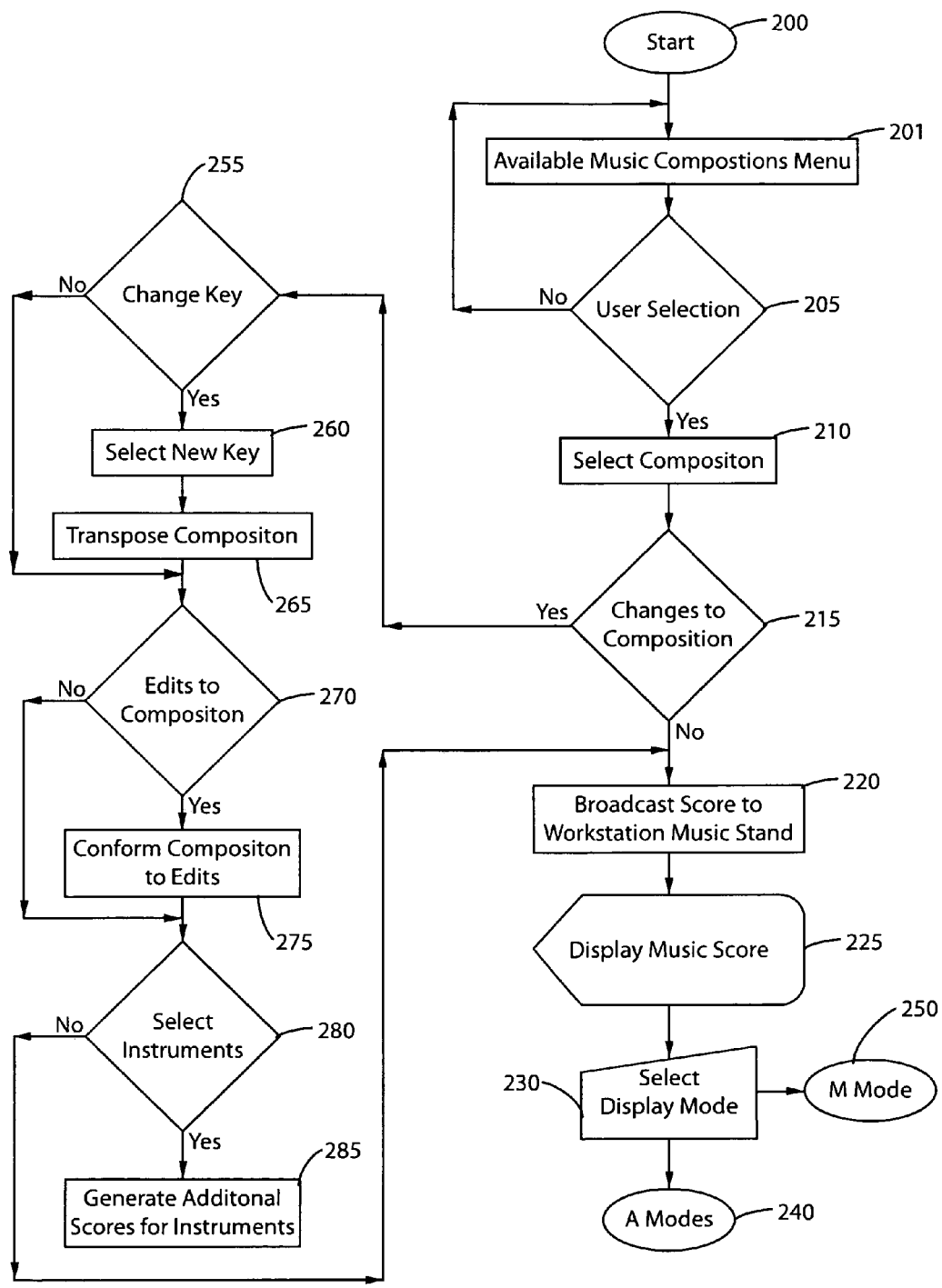
FIGS. 2A-2G show flow charts of the processes in accordance with the present invention.

FIG. 2A illustrates the overall operation of the music composition communication workstation. It begins by starting up the system (200). The system then provides a menu (201) that allows the user to select (205) a listing of available music compositions. The user then selects one or more compositions (210). If the user selects one from the menu that is locally stored, it directly retrieves the information. Alternatively, if it's not something locally stored, the system couples (e.g. will dial up or go through a database or network) to a remote storage site and requests and receives the selected compositions.

If there are desired changes to the composition (such as to the key (255), or note editing (270), or selection of form of display or instruments (280)), then those can be respetively accomplished as illustrated at blocks (260), (265), (275) and (285).

If no changes are desired, the musical score for the composition that is selected is broadcast, transmitted, or otherwise transferred to the workstation music stand (220). It is internally stored in the local workstation music stand. Next, the score is displayed (225) on the workstation display (e.g., LCD or CRT) or a video projection system. The display can also be part of an integral stand-alone workstation or an interconnected group of components including a personal computer (such as Macintosh, or DOS or Windows PC).

The display mode selection is then made (230). This permits selection of an operational display mode, not simply choosing the resolution or color. The two main choices in the preferred embodiment are a manual mode (250) and an automated mode (240). In the automated mode selection (240), there are many sub-modes or options, such as the operational mode that permits the performer or user to do their performing without having to tend to the selection of the portion of the music to be displayed or the turning of pages. In the auto performance mode, there is provided the simultaneous displaying of the selected musical composition, and a display representative of the audio performance of the user, and a divergence signal or divergence data representative of analyzing the performance, preferably in approximately real-time.

Figure 2B:
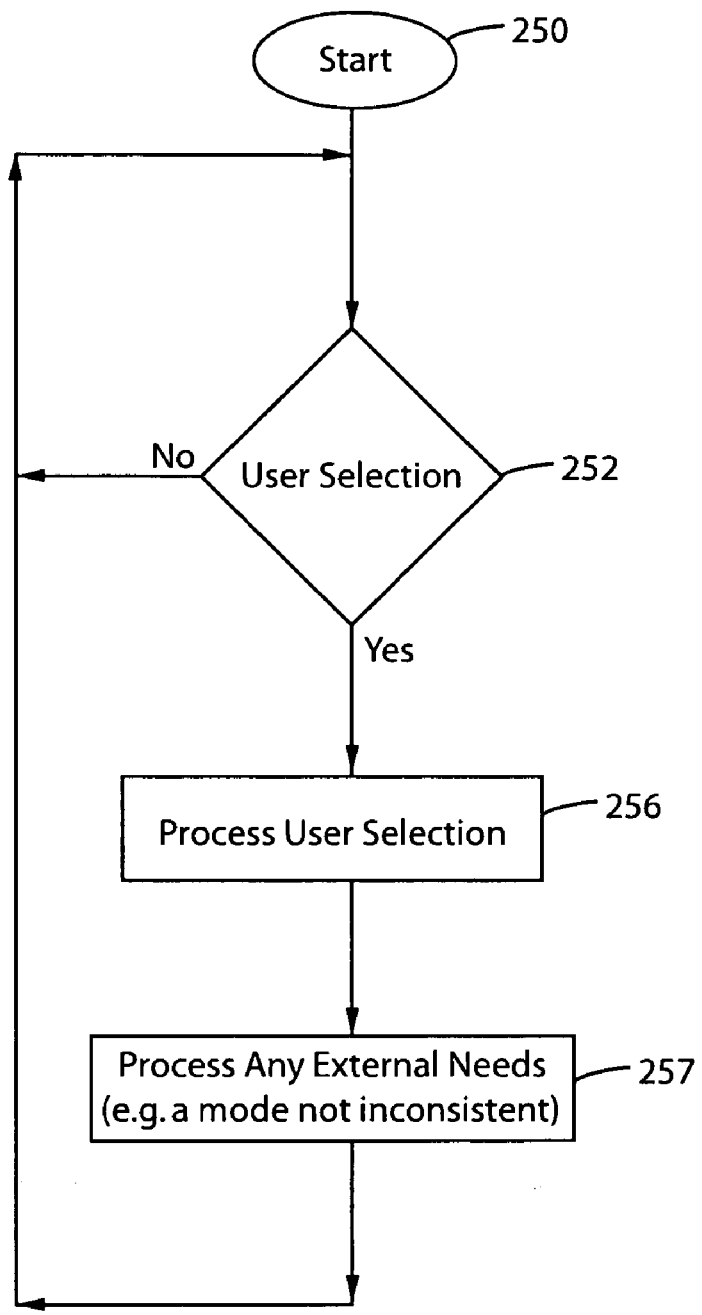

FIG. 2B illustrates the manual mode (250), which provides for user manual selection of functions (252). There are many functions that the user can select, even in the manual mode, such as hitting a button or a touch screen to cause the turning of the page of the display. Another function is to go back a page or to scroll forwards or backwards. For those who are vision impaired, another function can increase the font size of the music presentation.

Thus, there are many manually selected functions that can be provided. While the manual mode can have automated functions selected, it is distinguished from the automated mode where control is partially predefined without user assistance. In the manual mode (250), the user selects any and all features that are going to be provided (some of which can be automated). The selected function is then processed (256).

Next, any ongoing needs are processed (257). These needs can include any overlapping automated function (not otherwise inconsistent with any other selected function).

Figure 2C:
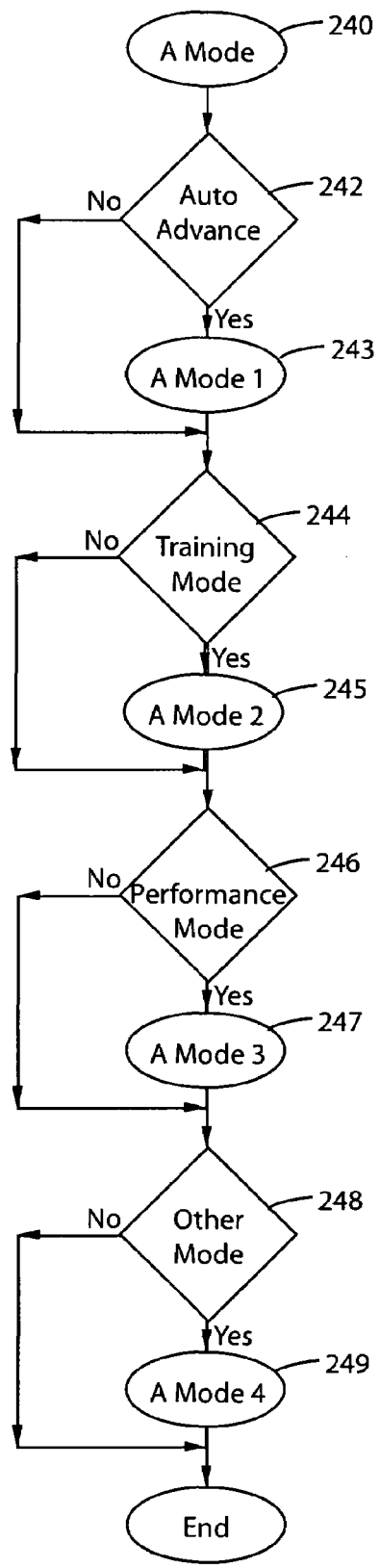

Referring to FIG. 2C, the operation of the automated mode "A Mode" (240) is illustrated. First, the user selection of the desired automatic mode is detected and responded to, illustrated as the auto-advance option (242), the training option (244), the performance option (246), or any one of a number of other options (248) as is described in further detail hereinafter. For example, auto repeat mode can be selected by designating the start and stop points, and the number of times to repeat a "looped" portion (or portions) of the displayed musical composition. Marching band mode (auto-advance based on metronome function, conductor control, etc), auto-compose mode, and many others can also be implemented. The order of selection of auto-advance, training, or performance mode is arbitrary, and the user can alternatively decide from a menu where all are simultaneously presented as choices.

The display can advance the music by page option, or by a user selection of one of many options (e.g., scrolling, tablature, video graphic tutorial display, etc.).

Figure 2D:
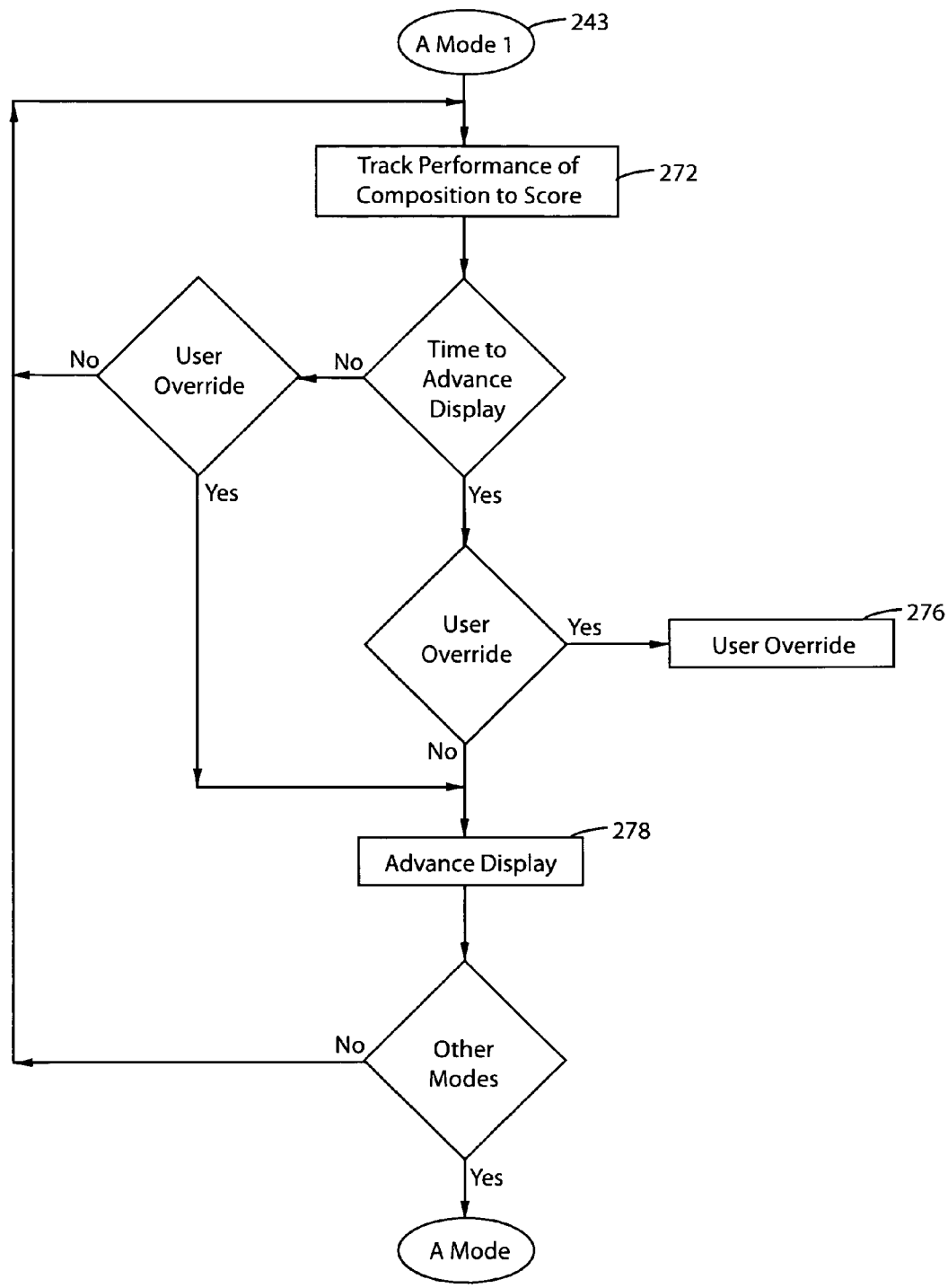

Referring to FIG. 2D, the automated mode 1 for auto-advance operation (242) of FIG. 2C is illustrated, where the user has selected an auto-advance performance mode. In this mode "A Mode 1" (243), the system tracks the performance by the user of the composition to the score (272). Performance refers to the actual performance by an individual person (or people) who is (are) reading the musical score upon which the performance is based. Whether that score is in tablature format, staff and clef and note notation, or some other format, the system generates appropriate signals to permit comparison of the user's performance to the musical score.

Based on a comparison, a decision is made pursuant to selection criteria programmed into the system (such as the rate at which the piece is being played, the time signature, the tempo, the rhythm, and the advancement of the music on the available display), the display presentation is advanced (278). In some cases, the music might move backwards, such as with D.S. Coda. The presentation of the display tracks the performance to permit smooth, uninterrupted playing or singing. The capability can be provided for the user to override this auto-advance, such as for practicing where it is desired to keep going back over sections. In this case, a user override option (276) is permitted to alter the automated operation. Upon cessation of user override, the system can be programmed to stop, to automatically return to the regular auto-advance mode, or to process other auto-modes (279) of FIG. 2C.

Figure 2E:
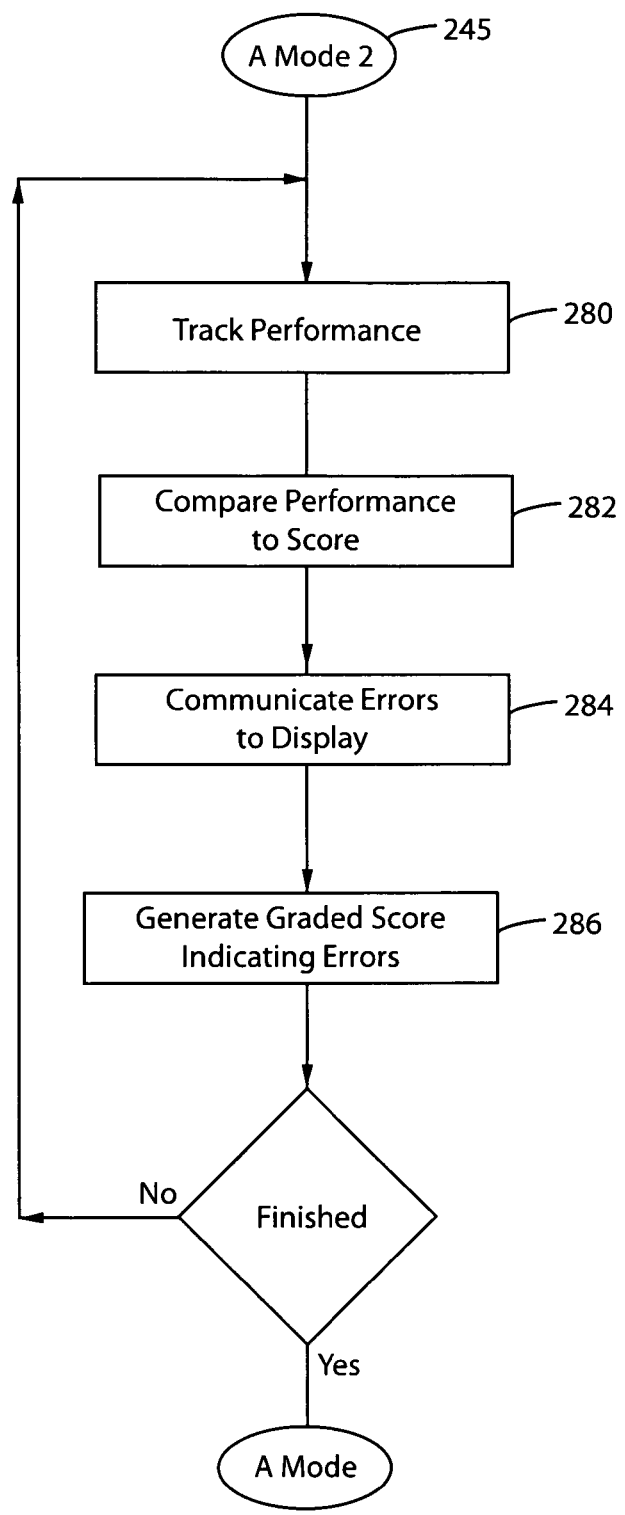

Referring to FIG. 2E, the automated mode "A Mode 2" (245) operation of FIG. 2C is illustrated corresponding to the training mode. In this mode, the system tracks the performance (280) of the individual user to the composition score, primarily for the purpose of permitting a critical analysis and comparison of the performance to the score (282). This analysis determines divergence from the selected musical score, and reveals errors or deviations from desired performance goals (e.g. match of timing of notes, duration of notes, pitch of notes, etc.), and to display those errors (284) (such as by audio or video means). Predefined performance goals provide the knowledge basis for expert system based analysis.

The system can then generate a graded score (286) indicating errors, and can present it in numerous formats such as histograms, frequency of errors, spacing of errors, etc. Identification of when the errors occur (e.g., only when going from slow to fast, or fast to slow), absolute position within the score and so forth, are also tracked and reported. Other expert system rules can be provided by music teachers which give the necessary parameters for modeling expert system reasoning, as well as guidance and suggestions on how to correct problems such as via display text, graphics, audio, etc.

The comparison of the performance to the score in the training mode is for the purpose of detecting the performer's compliance to parameters (such as the tempo, rhythm, filter, parameter, pitch, tonality, and other features that are adaptable or can be modified by performers). This parameter information is available and published in numerous forms. Thus, having provided this core set of parameters, the system can thereafter perform the training automated mode.

Figure 2F:
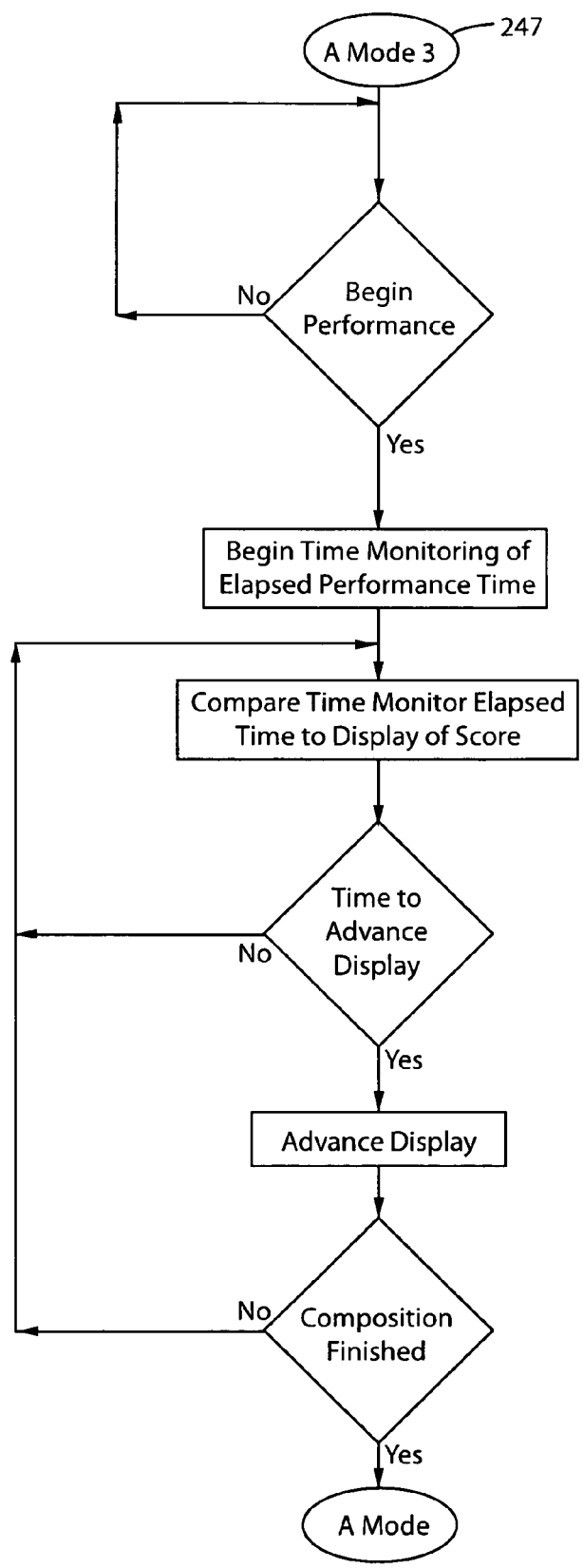

As illustrated in FIG. 2F, automated mode 3 "A Mode 3" is the performance mode (247). of FIG. 2C. In this mode, the operation is as in automated mode 1 (auto-advance mode) except that no user override is permitted. Its primary purpose is to accompany the performer during the entire performance of a score as an automated page turner. The tracking of the "page turning" to the performance can optionally be based on inputs or criteria independent of a performer's actual performance input (e.g., microphone), such as a built-in metronome clock, a central control (e.g., a conductor or special user input), etc. Additionally, performance characteristics can be tracked, computed, and reported as in the teaching and training mode. Training feedback can optionally be provided real-time, or subsequent to completion of performance, to assist the performer as in the training mode. Alternatively, the score can be presented in a moving score mode (e.g., vertically, horizontally, or otherwise) or linear presentation as opposed to a real page turning display.

Figure 2G:
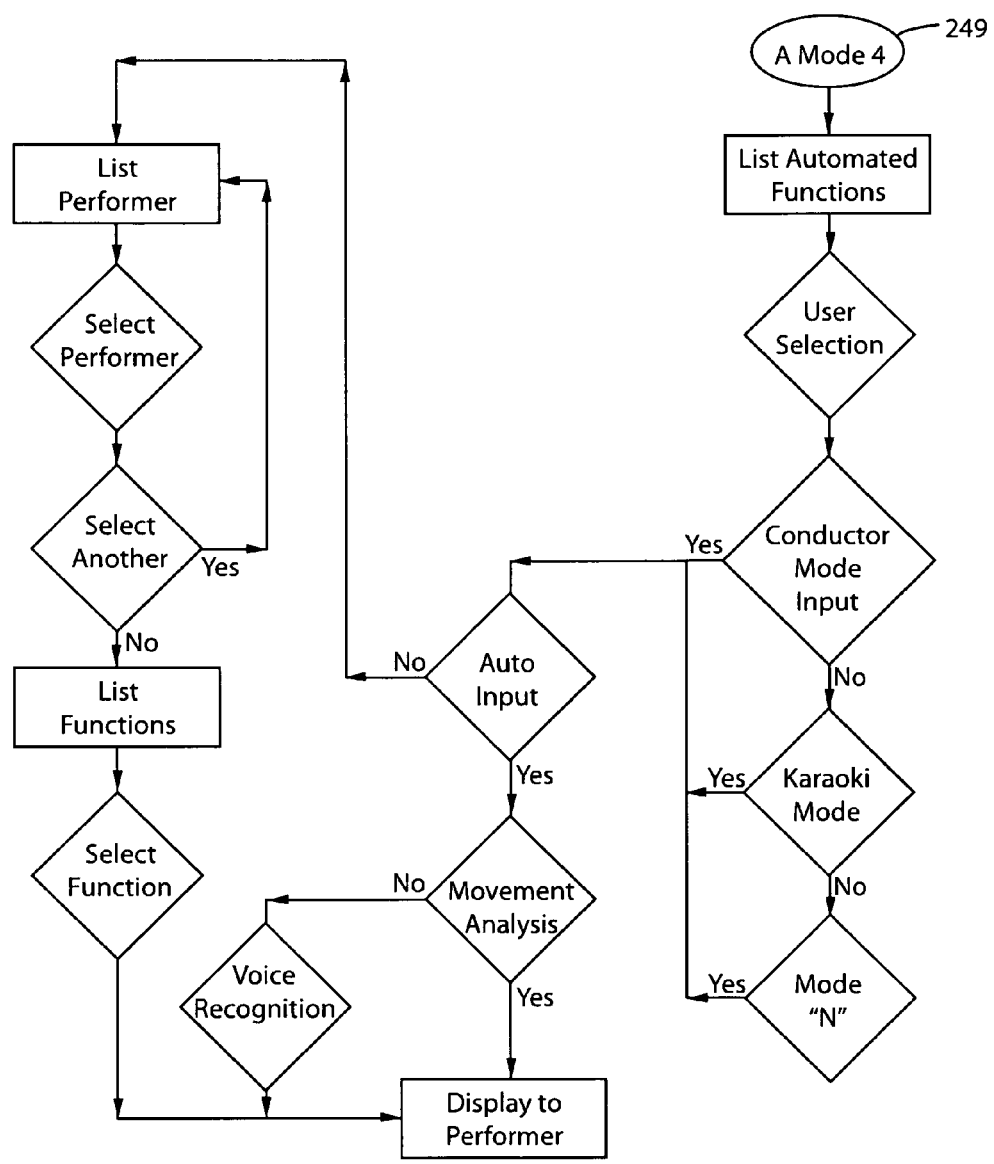

FIG. 2G shows the operation of automated mode 4 "A Mode 4" (249) of FIG. 2C which provides for the processing of other automated functions selected by the system. These modes can include conductor mode, karaoki mode, etc.

In conductor mode, a conductor can control communications of signals to his or her performer (such as "increase volume", or "increase tempo", or "play staccato"). Icons can be provided where the conductor simply touches a touch screen (or other input mechanisms) to supplement his hand and body motions to permit more effective communication with the performers. Alternatively, as illustrated in FIGS. 9 and 10, in a more advanced system version, the conductor's movements are first learned by a monitoring system, based on user definition and assignment of meanings for movement to provide an expert knowledge database.

Figure 9:
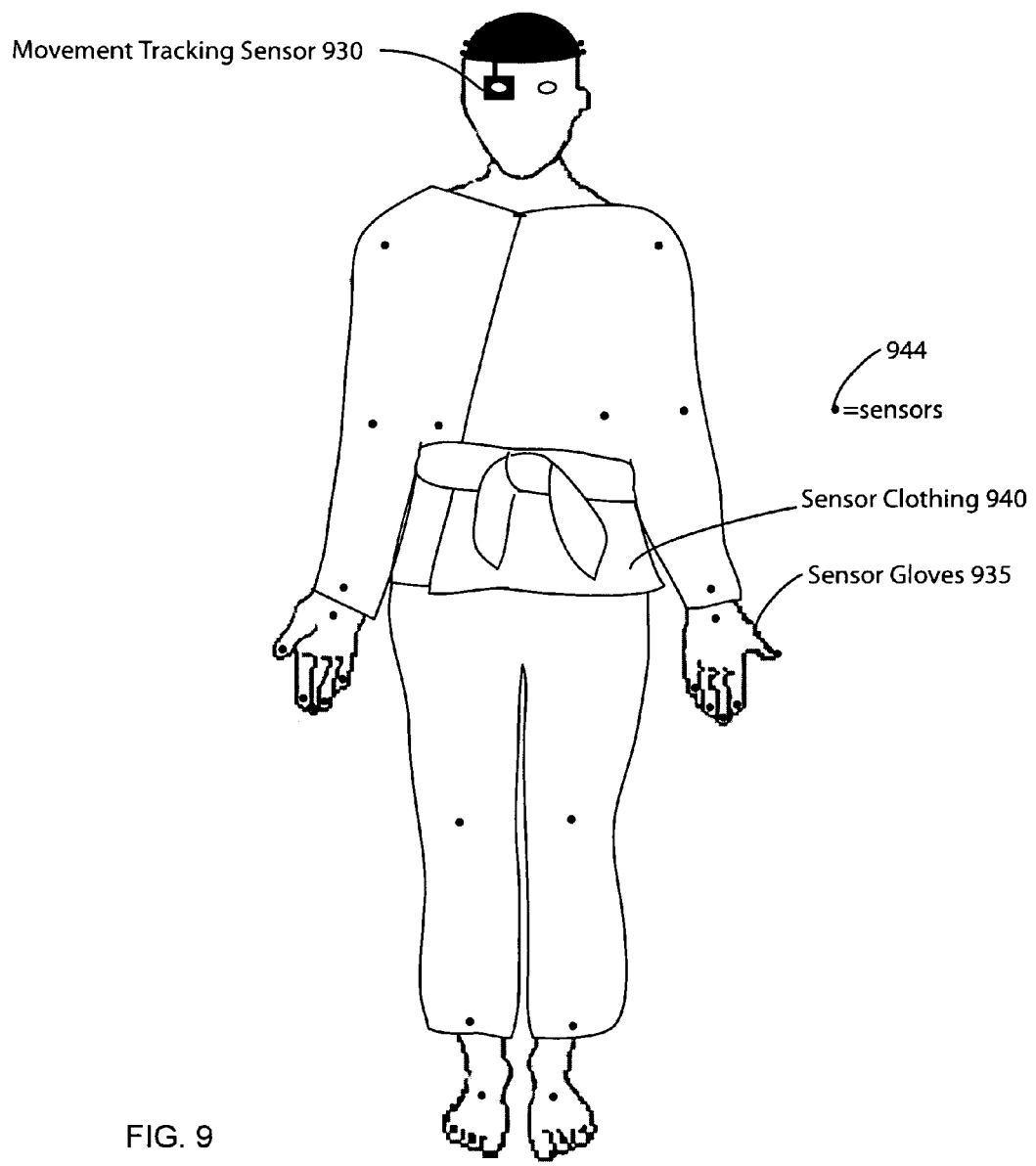
FIG. 9 shows a person outfitted with a sensor body suit in accordance with one aspect of the present invention.
Figure 10:
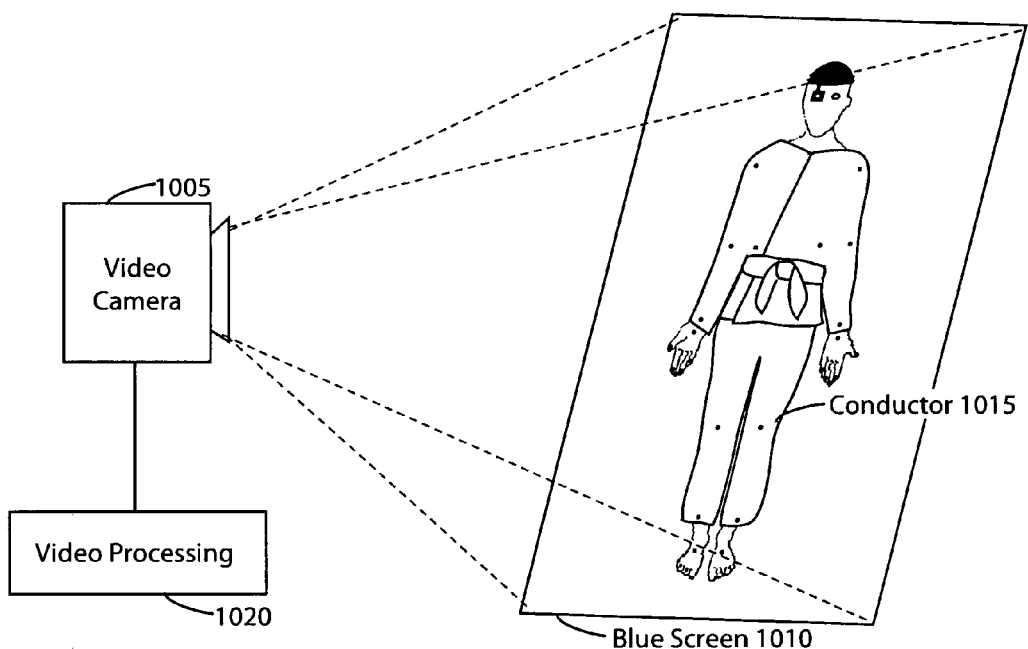
FIG. 10 shows a movement and pattern recognition system in accordance with one aspect of the present invention.

This system provides for tracking of movement input such as in FIG. 10 via video camera (1005) input of the conductor (1015) against a backdrop (e.g., blue screen) (1010) is processed by video processing unit (1020), or, as shown in FIG. 9, via body glove technology (gloves (935) or sensors (944) or sensor clothing (940) or head or eye movement tracking sensor (930) (such as used in virtual reality, flight simulation, avionics equipments (such as jets and space travel), and sports players for analyzing movement) to provide the necessary movement input. This movement input is analyzed utilizing the expert knowledge database to automatically generate a display (video and/or audio) to provide local visual and/or audio reinforcement on the local display (such as overlaying on a then unused portion of the music score display as a picture in a picture) to permit audio and video reinforcement of the conductor's body language. Thus, "a hush" body language signal that is directed towards a particular section of the orchestra would automatically be interpreted to cause the system to indicate, and only on that particular section's respective displays, a message (e.g., big face with a finger in front of it making a hush sound with a "hush" sound simultaneously output from a speaker). The conductor mode provides many benefits to performance and communication.

For all these automated modes (e.g., A Modes 1, 2, 3, 4), training feedback can be provided real time or subsequent to performance at either or both of the performer's workstation and a second (e.g., teacher's) workstation.

The advantages of electronic music composition, communication and display are many. In addition to those discussed elsewhere herein, a capability exists for expert system based artificial intelligent type assistance where the expert system assists in many of the functions performed in musical composition and performance. For example, in the Auto-Compose Mode, if the words need to be changed to match the meter, equivalent terms can be chosen from the many sources such as thesaurus, dictionaries, rhyming dictionaries, encyclopedias, etc., to assist as well. Phrases from poetry, selected and indexed by content or topic can be re-expressed to create new works. Drum and rhythm section accompaniment can be expertly suggested, as well as harmonies, melody lines to accompany chords, chord progressions to accompany melodies, harmonies to accompany a melody, and suggested musical instrument groupings to support a particular sound, rhythm, style, tonal quality, etc.

The expert system can be built from commercially available technology, including component hardware systems with supporting software, as well as commercially available software packages which operate on commodity-type personal and business computers such as the Macintosh by Apple Computer, Windows and DOS machines based on the X86 and Pentium processor technology of Intel, technology based on the Power PC and 68XXX processor by Motorola, DEC PDP-11 technology, Sun workstations, etc. Custom microcomputer or DSP based system architecture on a chip can also be constructed, as well as ASICs, custom or semi-custom logic.

The system can be designed to take advantage of expert system design knowledge. A database of rules and facts are provided, and accumulated over time by the system in a self-learn mode. The expert system itself has the necessary logic to probe the user, monitor the performance, and apply the rules to provide feedback and reports to the user of skill level, errors, automated performance display, etc., starting with a base defined set of rules, instructions, and a knowledge database specific to music.

The form of the musical score communication can be easily shaped to fit needs. One example is MIDI (Musical Instrument Digital Interface standard) which has advantages such as of bandwidth of storage used, is widely available commercially, is standardized, etc. However, signal processing, text, icon-based, object based, and various other forms of storage, user interface, and processing can also be applied to more specific applications of product.

Figure 3:
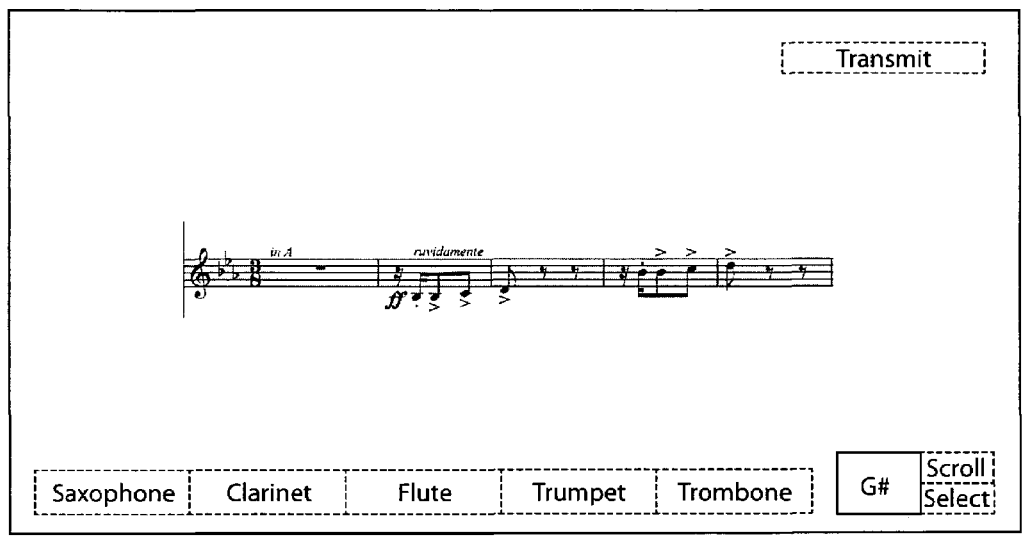
FIG. 3 shows one embodiment of the display for the music display workstations and input devices in accordance with the present invention.

FIG. 3 illustrates one embodiment of an LCD display used for input control and for displaying the information from the processor and memory. In the preferred embodiment, this LCD is a touch sensitive screen enabling the functions associated with each displayed button to change, and also for the displayed buttons to be moved around the screen, depending on the function to be activated. The musical score may be edited by the conductor, such as by touching the individual note after which he is presented with a number of notes to replace the touched note. The lower portion of the screen displays instruments from which the conductor can select which instrument will be playing the composition. After a button on this screen has been touched, a number of sub-screens may come up, each with their own individual touch sensitive areas and functions to be activated by those areas. Alternatively, in addition to or instead of the touch screen, the system can provide input via separate key switches, voice recognition, etc.

As an example, if the conductor touches the transmit key on the main screen, he will be presented with a screen showing all of the instruments that he has selected for that piece and a button labeled "ALL". He may now transmit to each individual music stand or by depressing the "ALL" area, transmit to the entire orchestra.

The music library can be contained ("stored") on non-volatile storage either locally or at a remote central site containing the entire (or a subset) database of all possible music (that is then downloaded to local storage on request, either real-time at performance time or in advance.)

Alternatively, the music library can be provided on storage medium that can be easily transported and used on site locally with the presentation system. Thus, for example, disk drives, cartridges, FLASH RAM cards, plug-in memory modules, or a CD-ROM or multiple CD-ROMs in a CD-ROM changer can be used to store and contain massive data libraries on musical compositions. While this would be a more expensive route than shared use of a central library, requiring each musical group to obtain libraries on all possible compositions they may want, it has the advantage of speed, flexibility, no need for communication with a separate remote source, and creates a whole new mass marketing area (such as for CDs or Digital Audio Tape (DATs)). Another way of utilizing this technology is to maintain a history of music used, either with the remote music library or local music library. This could be done for many reasons, including copyright royalty assessment, determining a history of musical performances and requests for future use in determining performance itineraries, etc. Alternatively, a hybrid of locally stored and centrally shared libraries can be utilized to optimize cost, speed and flexibility benefits.

In accordance with another aspect of the present invention, each display workstation can also provide the ability to convert performed musical compositions into annotated musical compositions, generating the appropriate musical notation (e.g., staff, tablature, MIDI), notes, time signature, key, instrument, or user type, etc.

Figure 4:
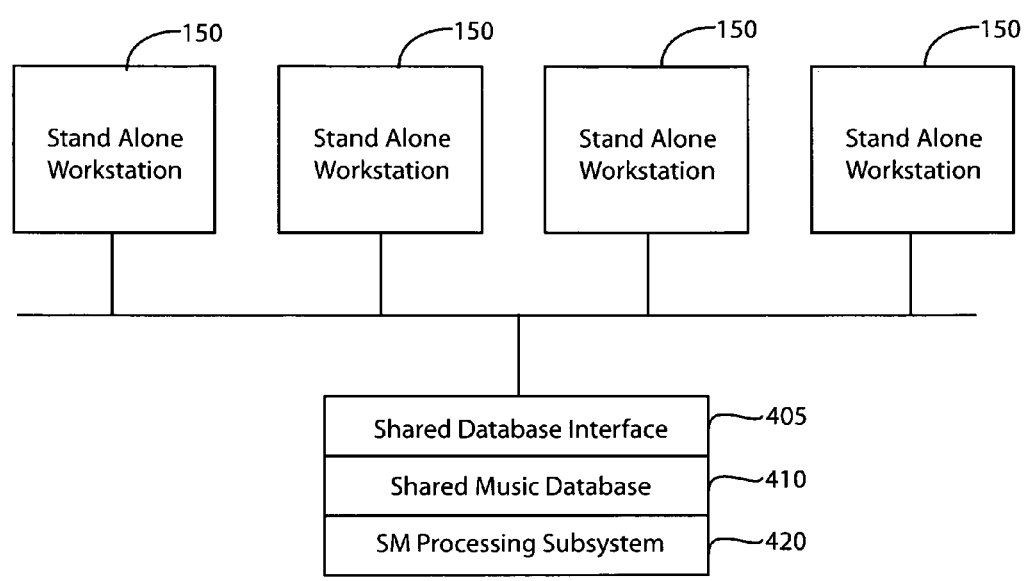
FIG. 4 shows a shared music database and stand alone workstation embodiment in accordance with the present invention.

The display workstation can be implemented as a totally self-contained workstation, where each workstation contains its own processing subsystem, optional communications interface (such as wireless or cable) for network use, input/output interface including one or more of a user input keypad, a speaker, a microphone, joysticks, push buttons, etc. Each of the stand alone workstations can then operate with a local database or couple to a shared music database as illustrated in FIG. 4.

The stand alone workstation(s) (105), are coupled to the shared database interface (405), and can either couple remotely (e.g., via phone lines) to the remote shared music database or to a local shared (410) or dedicated music database. The shared music database (410) can either be primarily a storage means (e.g., hard disk or CD-ROM), or can include a processing subsystem (420) for local intelligence. In one embodiment, the stand alone music workstation includes the shared music database (410) and interface (405), non-volatile local storage medium for the shared databases (410), and a local processing subsystem (420), and can operate completely stand-alone. In an alternate embodiment of this stand-alone device, the shared database interface is contained in the stand-alone workstation (but not the shared music database or processing subsystem), and provides capability for communication with a stored database (410) remote from the stand-alone device.

In either of these embodiments, an alternate additional embodiment provides capability for each stand-alone workstation to function as a master stand-alone, or a master or slave workstation within a workstation set including multiple stand-alone workstations, wherein one is designated master and the rest are designated slaves. The slave workstations in this configuration receive communication of music compositions to be displayed from the master workstation, thereby permitting one shared music database to be communicated among all workstations which are a part of the group. It is to be appreciated that the shared music database function can be distributed in many different ways among the workstations, or separable from and independent from the workstations. The choice is simply one of design, and the illustration herein should not be taken in a limiting manner.

In one embodiment, the master workstation has complete control over the slave workstation. Anything displayed on the master workstation is also displayed on the slave workstation. It is also possible for the user to mask certain portions of the display of the master workstation before it is displayed on the slave workstation. In this manner, the conductor, using the master workstation, can transmit to the slave workstations only that information that is required by the orchestra members.

In an alternate embodiment, the slave workstation communicates performance parameters or deviation signals to the master workstation, for error analysis feedback.

In accordance with another aspect of the present invention, means are provided wherein a plurality of individual workstations are coupled together in the network configuration to provide for networked communication of musical performance data wherein each of the individual music workstations provides for capturing the performance data for a users performance and communicating that performance data to a master or a conductor workstation which synchronizes and combines the plurality of individual workstations performance data to create a composite virtual performance data output which is recommunicated back to all of the individual workstations in approximately real time, so that the individual workstations can receive the composite virtual performance data and provide an audio output (and/or visual presentation) of the combined composite virtual performance data including all of the individual workstations users performances. While the networking can be used in conjunction with other features and embodiments of the present invention, including communication of musical compositions for display, and other musical performance data analysis and data communication, as well as inter-musician interpersonal communication, the networked embodiment of the present invention permits synchronized virtual performance thereby permitting multiple remotely located individual workstations to physically separately perform with the benefit of hearing in approximately real time the combined result of all the performances at the individual workstations with their own individual performance.

In accordance with another aspect of the present invention, means are provided to permit a user of the music workstation to accomplish a transposition of a musical composition in pitch, tempo, and otherwise. In a preferred embodiment, the lead voice or instrument can audibly indicate the key via the microphone input or via another type of input stimulus. The workstation can analyze the user input, determine the key, pitch and tempo for a musical composition being partially performed by the user, and adjust and transform the composition to be displayed in the new user desired key, pitch, tempo, etc., either solely for use on that workstation, or communication for use on one or more other workstations. In a networked version, this user input can also be communicated to other workstations for use by one or more of the workstations in transposing, or communicated to a master workstation, which transposes and rebroadcasts the transposed composition.

Alternatively, the user can input the pitch, tempo, and key via the user input (e.g. keypad, joystick, push buttons, voice recognition, playing of an instrument, etc.) and the system performs the transformation and displays (and/or prints out and/or audibly performs) the modified transformed composition for the user. Additionally, where a musical composition is written for one instrument and a different or additional instrument version is desired for simultaneous performance, the user can indicate the other instruments via the user input, and the system will generate the appropriate displays. The workstation can also provide an audio output of the transformed musical composition, either for the individual additional instrument or voice transform and present it, or for the composite of additional versions and the original version, to hear the blended piece.

Figure 5:
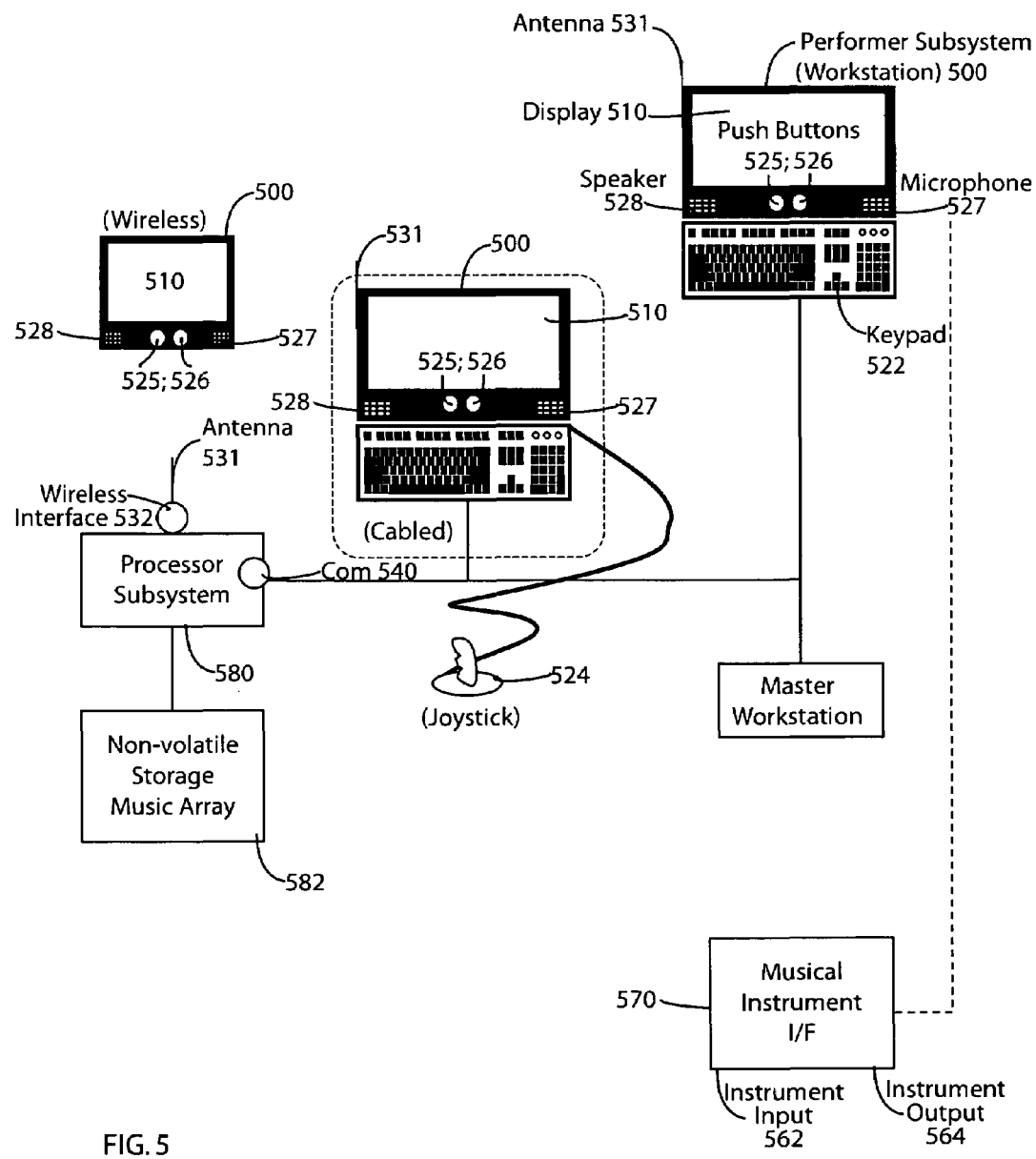
FIG. 5 shows a music communication system in accordance with the present invention.

Referring to FIG. 5, a music communication system is illustrated comprising multiple workstations (500) each comprising a display (510), user input such as a keypad (522), a joystick (524), push buttons (525 & 526), a microphone (527), and a speaker (528). The workstation also includes communication interface means such as a wireless interface (532) including an antenna (531), or alternatively or additionally a wired or cabled communication interface (540). Each workstation further includes a local microcomputer subsystem that provides local intelligence and management of functions in the workstation.

In the networked embodiment, where multiple physically separate locations each having one or more individual workstations provide for communication of performance data from the individual workstations and presentation by the individual workstations of the combined virtual performance data at the individual workstation, to provide for a virtual performance. In this case, the communications interface would utilize slightly different structure, such as a phone modem (analog modem), a cable modem, ISDN as between locations, etc.

Communications interfaces of various types are well known and commercially available. At the present time, they are available for purchase at the chip, board, or system level. In fact, many single chip microcomputers include communications interface capabilities, wired or wireless.

The workstation further includes an optional musical instrument input (562) and a musical instrument output (564) that permit the coupling of a musical instrument via a musical instrument interface (570) directly to the workstation. Thus, a keyboard, electric guitar through appropriate input, or a microphone input through the interface (570) permits instruments or voices to be directly input to the workstation for direct input independent of the microphone (527).

The instrument output permits coupling of the instrument input signal, either directly fed through or as modified by the workstation for output to the appropriate public address or amplification and presentation system or separate analysis system. The workstations are coupled either via wired or wireless communication to a processor subsystem (580) that includes a processor, non-volatile memory, read/write memory and an interface to a non-volatile storage medium (582).

The processor subsystem (580) includes an appropriate communications interface, such as a communications interface (540) for wired interface or (532) for wireless interface including antenna (533). The processor subsystem couples to a non-volatile storage medium (582) containing, among other things, application programs, transformation programs, and either a shared music library interface application program or the actual shared music library and access program.

Figure 6:
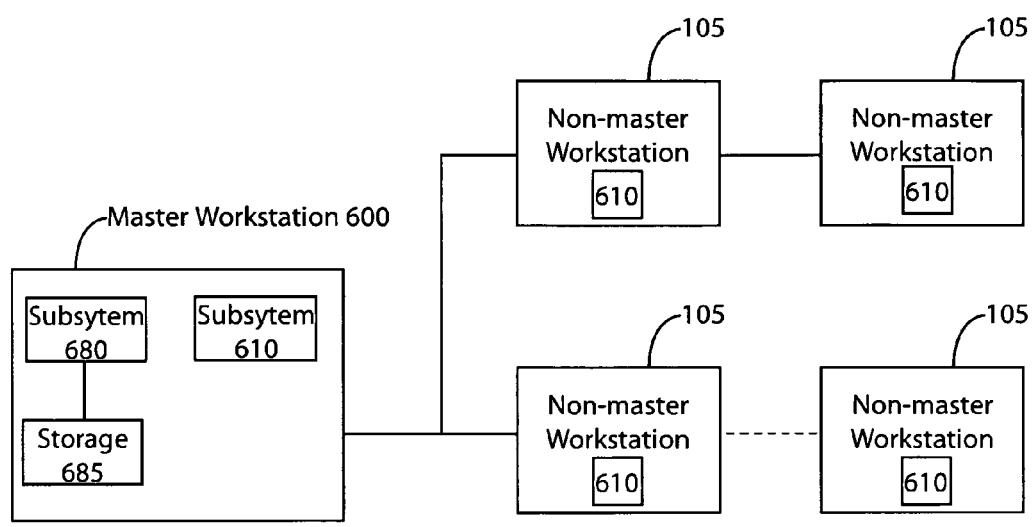
FIG. 6 shows a master workstation and slave workstations in accordance with the present invention.

As described above, the processor subsystem (580) and non-volatile storage (582) music library can be built directly into one of the music workstations (500) to be a master, with the other workstations being slaves, that can either include the processor subsystem and non-volatile storage or can be lower cost dummy slave terminals. As illustrated in FIG. 6, a first master workstation (600) provides a basic workstation subsystem (610) plus contains the processor subsystem (680) and non-volatile storage system (685) as a part thereof so as to provide a complete stand alone music communication system, and be capable of acting as a master or master/slave. This master workstation(s) (600) can function as a stand alone, or can couple to one or more other workstations, including one or more masters (600) and/or one or more non-master workstations (105).

The multiple connected workstations can operate as stand alone workstations using their local intelligence for displaying downloaded or resident music compositions. They can also interact in a master/slave linked environment, where one of the master workstations (600) asserts a master status, and all other interconnected workstations, whether workstations (105) or master/slave workstations (600) operate in a slave mode coupled to independent on the designated master. Additionally, masters can communicate between each other for a master/master network configuration.

Alternatively, the multiple connected workstations can operate together in a networked virtual performance mode, or in a networked communications mode. A dedicated stand alone or distributed master workstation architecture can provide for the coordination and combination and synchronization of the multiple individual performance data outputs into a combined virtual performance data output.

Figure 7:
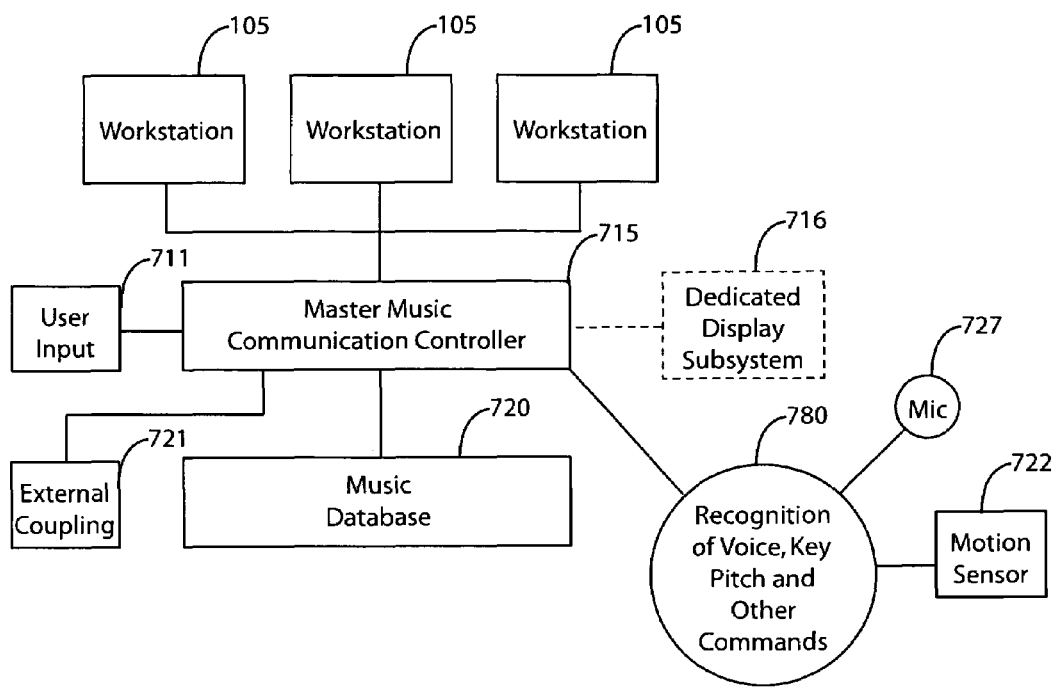
FIG. 7 shows an alternate embodiment of the present invention using one or more of the workstations coupled to a master controller and music database.

Referring to FIG. 7, an alternate embodiment of the present invention is provided where one or more workstations (105) include, at a minimum, a display of the music notation. These workstations are coupled to a master music communications controller (715) that provides for a separate user input (711) which provides input interface, such as to a MIDI status stream, computer data links (such as RS232, modem data link) etc. that designate requested musical compositions, transformations, and display requests for various ones of the coupled workstations.

In an alternative embodiment, the master music communications controller (715) provides for additional functionality including virtual performance mode, wherein the input interface (such as the MIDI stream, computer data links, etc.) provide one or more of musical compositions data for display, transformation information, display requests, user individual performance data, and wherein the workstations respond to the master music communications controller to couple their individual performance data and receive back the combined virtual performance data.

The workstations (105) access the music database storage means (720) that provides the data for the requested music composition via the master controller (715). The master controller (715) displays both the requested music composition as well as user interface communication for the music communication system to be displayed on either a dedicated display (716) or on one of the workstations (105) as designated by the master controller (715). The music database (720) can either be local, or can be via a data link (e.g., phone line, RF, otherwise). In one embodiment, a motion sensor subsystem (722) monitors motion of a target person and responds in accordance with predefined movement interpretation characteristics parameters, such as for a conductor.

In a preferred embodiment, the user input means (711) is comprised of a key switch device, such as a touch membrane keypad or capacitance touch surface. Alternatively, in one preferred embodiment, the user input is provided via a touch screen technology. Touch screen technology permits the display of user interactive icons and legends including text and graphics making possible unlimited customization of user input structure according to task needs. Thus, specific switches or sequences of touches to the touch screen can be associated with common use icons from the task being performed in conjunction with words to provide ultimate clarity. User error is virtually eliminated, with the aid of automatic entry error detection, such as defined fields, mandatory fields, etc.

Alternatively, the microphone input (727) can provide for coupling of user speech to a processor subsystem (780) that uses any of a number of commercially available and well known speech recognition algorithms. These algorithms provide for speech recognition input control, either solely or as a supplement to touch screen or other tactile input mechanisms.

In a deluxe embodiment, an output (721) is provided that permits coupling of an external display, such as a color monitor, projection unit, or other display presentation system including one or more of audio, visual, and audiovisual.

Additionally, the display presentation output of the workstation can provide for an audio output presentation of the musical performance, either generated by the work station responsive to the music composition data, to the users performance, to the combined virtual performance data, or responsive to an external source. Additionally, a visual or audio visual presentation can be provided to provide information feedback to the user on both their individual performance as well as from and between individual workstations and/or the master controller or conductor workstation.

In accordance with another aspect of the present invention, means are provided for moving through the printed (displayed) notation of the music in synchronization with the live performance from the displayed musical notation.

Musical notation is used, in the generic sense, to refer to any way of conveying musical performance instructions including but not limited to common musical notation with staffs, notes, sharps, flats, and clefs, extending to written instructions in text form to supplement this or supplant or partially replace, as well as alternate forms of expression such as chord charts, words and chords (letters), tablature, any video, graphic, audio, audiovisual or other display presentation or combination of the aforementioned types of presentations.

An annoyance in performing music using any written notation (whether on paper or displayed on a presentation apparatus such as a screen) is smoothly performing music and timing "flips of pages" (or the communication of change to a third party, such as touching a key or button). This is especially true when the user is marching and both hands are required simultaneously.

In accordance with one aspect of the present invention, means are provided to accept inputs from one or more sources that initiates a "page turn". Types of inputs include conventional touch input apparatus (such as key switches or capacitive touch pads), motion sensing gear, and automatically when operating in the operational mode of Auto Mode. The motion sensing gear can be for a portion of the performer's body, such as a head tilt sensor or an optical eye movement sensor, etc.

Additional types of inputs that can initiate a "page turn" include voice or sound recognition apparatus built into the microcontroller system. This apparatus has the ability to use pattern recognition specific to the sound or user voice and words being said (for extremely high accuracy). Of course, any type of user actuated device such as a foot or hand switch, or head motion device, or sound or voice recognition system, in a preferred embodiment, is selectively permitted to control the override of the normal progression of the music's play.

The override may cause the progression to go backwards or forwards in the music score irrespective of the normal reading of it. The performance mode AutoMode blocks the user override to permit performance according to proper material timing and either progresses responsive to the music composition data timing, or in an optional embodiment, to the performer. This automatically moves through the musical score as written and preferably shows an indication of metronome time and an indication of the proper place in the score where the performer should be for that instrument at any specific time. This is especially valuable in a conductor mode of networked communication, where a conductor couples to one or more music workstations.

The user's performance can be compared to the score, and feedback can be provided to the performer as to the quality of their performance.

In the performance monitor mode, for a single user or multiple users, the user (or a remote teacher or conductor) can indicate the rate at which he feels the performer should be performing. A microphone input on the music workstation samples the user's actual performance and permits providing a graphical mapping (for the user or teacher/conductor) showing the relative synchronization of the performer's actual performance versus the conductor's desired performance.

In an alternate automatic advanced mode, the display of the music composition is synchronized to the performers actual performance. Thus, rather than simply indicating visually for the teacher/conductor or user what their relative performance was to the written displayed musical composition, the relative performer to written music synchronization information can be utilized to adjust the display rate of the actual musical composition to match that of the performer.

With use of appropriate sound baffling, a plurality of instruments can simultaneously be monitored and controlled by the conductor, so long as each instrument's output sound pattern is communicated directly to a respective workstation. The output of each of the workstations can then be coupled to the conductor's master workstation for further analysis and processing.

A workstation for an oboe may have a built in slide boom with a featherweight microphone to be able to receive sound input from the oboe. Electric instruments, such as guitars, keyboards, and other electrical analog signal sources can be fed directly to a line input that is appropriately buffered and filtered. Signal input can also be accommodated through a MIDI-interface subsystem that permits both utilization of data in workstation to workstation communications and utilization of MIDI-output at the station where the data was input.

For networked virtual performance, and for one aspect of output display presentation, the utilization of MIDI input and MIDI output, at each of the individual workstations and at the master controller workstation, permits the capture of the user performance and conversion to individual performance data which includes time synchronization information which can be communicated to the master workstation, which synchronizes and combines the individual performance data to generate combined virtual performance data which is then communicated back to the individual workstations which utilizing their MIDI output interfaces provide for display presentation (e.g. audio output) of the combined virtual performance data. Additionally, even where virtual performance mode is not selected, the provision of MIDI interface input and output on the workstations have other multiple beneficial users as discussed elsewhere herein. Additionally, other types of user performance to user performance data input devices and transducers can be utilized, as are well known commercially available including variations of analog digital converter input devices, audio signal capture, etc.

By combining the conductor and performance mode operations, the workstation can be enhanced to provide training and comparison of performance to actual music.

Some music is only available in annotated forms where there is not an existing signal showing proper synchronization of the signals. Thus, a controller subsystem (such as (780)) provides for real time conversion and analysis of syntax of the music notation, in conjunction with a precision clock metronome, and provides an indicator (such as color or other highlighting or bolding or accentuating) of the relative timing of the performance relative to a place in the sheet music (or other form of musical notation).

Existing forms of music notation can be converted manually, or can be converted automatically by scanning in sheet music, recognizing (using optical character recognition) the various elements of the music, and facets and specifics of the syntax in the form of notation including its constants and variables and protocols, and integrating via an artificial intelligence type expert system that notates, highlights, and accentuates via synchronized metronoming of time signature to music. Any of a variety of other means of converting music can also be used, such as direct input of musical performance signals processed via software that converts it into musical notation. Such software is commercially available, such as from ARS NOVA, Wildcat Canyon Software, Mark of the Unicorn, Inc., and Passport Designs, Inc.

Since the music notation is now in computer usable form, it is now an easy task to communicate, display, compose, alter, and transpose music (such as in key, for types of instruments or voice parts, and harmonies) via well known techniques.

Additionally, where the user input is converted into user performance data for the workstation, the users individual performance data is also now in computer usable form and if appropriately converted from performance to performance data, includes appropriate synchronization data relative to master controller performance synchronization signal. Thus, both the music notation is in computer usable form (making it easy to display, alter and analyze/compare), and the users performance is in computer usable form (digital individual performance data), it is possible to provide intelligent operation and analysis and utilization of both the music composition information and the user performance information, to provide for various automated modes and features to the users Implementation can also be in a custom design comprised of a microprocessor, nonvolatile storage memory, read/write memory, and whatever additional peripheral circuitry is needed (such as are available in ASICs, or single chip microcomputer chip sets including CPUs, DSPs, A/D, and other peripheral support circuitry). These single or multiple chip solutions can be utilized to create a dedicated system to perform complete music workstations performance criteria to support an extremely low cost, high volume music workstation solution.

A new form of communication is created in that both the process of communicating via standard notation is respected and adhered to, while at the same time permitting interaction and communication of music media signals ranging from simple analog, digitized (analog to digital converted), individual performance data (representative of the user's performance), and can optionally include timing/synchronization data.

A multi CD ROM changer accommodates indexed storage of hundreds of thousands to millions of musical compositions to permit complete stand alone operation of the user music workstation. Alternatively, an optional built-in or external modem can be provided to permit intercommunication with a remote central music database management system that permits both communication and down loading (and disconnect) for stand alone operation. Thus the workstation can stay on-line, pulling up music as needed, or can request a single or multiple pieces of musical works be provided to it, that are then downloaded from the central database manager. The user workstation then disconnects from the music database management system, and thereafter operates stand alone where all desired music is stored locally in storage (preferably non-volatile). Storage can be semiconductor, magnetic, optical or any other medium.

The use of virtual reality technology, including motion sensors and body gloves, permits monitoring of various other things (as shown in FIG. 9). For example, as shown in FIG. 10, a camera in conjunction with analysis logic, such as expert software, can monitor motion of role model behavior and compare performer behavior. Hand, finger, arm, leg, eye, head, body, and mouth movements can all be monitored and constructive critical feedback can be accumulated, analyzed, and fed back to the user or teacher, for performer training, or performances, or for conductor communication.

The input of monitored movement data is provided to the user workstation, permitting precise mechanics training such as finger position, the angle of striking of strings relative to the neck of a violin or guitar, or they can be used to permit the virtual performance of music by a performer using a virtual link apparatus such as a virtual reality glove and head movement detection apparatus. The user can then perform a piece with their own personalization without any musical instrument in fact.

For example, the guitar portion for a piece of music could be displayed in notation form and actually performed according to the timing of movements of the user's fingers (either actual fret positions, or only timing information). To add further reality, a mock guitar, keyboard, flute, or other instrument can be used and combined with virtual effects to provide for music performance and personalization. Thus, for entertainment purposes, users could perform as part of a symphony orchestra playing a violin portion. If they performed out of time, they would hear their instrument's performance out of synch with the rest of the orchestra's performance.

There are numerous ways to embody the conductor movement interpretation system. As illustrated in FIGS. 9 and 10, one is utilizing the body movement detection apparatus prevalent in virtual reality, sports medicine, etc., as discussed above, to identify specific movement patterns or signal parameters associated with certain movement patterns, to initiate a display presentation, audio, video, or audiovisual to provide a presentation associated with movement of the conductor. Alternatively, other techniques can be used such as taking the video feed from a video camera or other video source (e.g. VCR) and having the conductor interpret his movements and assign them unique meanings, to create a lexicon of his movements and corresponding meaning.

For example, rapid downward movements of the hand from up to down, in a certain manner, indicate "decrease the volume." When he points at a particular section at the same time as he is doing that, he is indicating that only that orchestra section is to reduce volume. In this manner, either camera input of movements, glove sensing of movements, or other techniques (such as audio, ultrasonic, etc.) can be used to track movement to permit associated meanings to be attached or indexed to particular signal parameters or parametric signals of the meaning of the movement parameters as provided by the conductor input device. For example, in the case of the virtual reality glove, that input would be the signal output of the glove as interpreted by associated software in a processor (such as a PC or a MAC). Alternatively, for example, in the case of video camera input, it could be pattern recognition or analog signal comparison to determine the presence of certain signal patterns indicating to the system to initiate automatic communication of a conductor presentation. In so doing, the conductor is able to rapidly convey his meaning, focus it to a particular group of instruments, and be done with it. He doesn't have to focus very long or concentrate to make sure they've gotten his signal. Instead he can focus on listening to see if they got his message.

Figure 8:
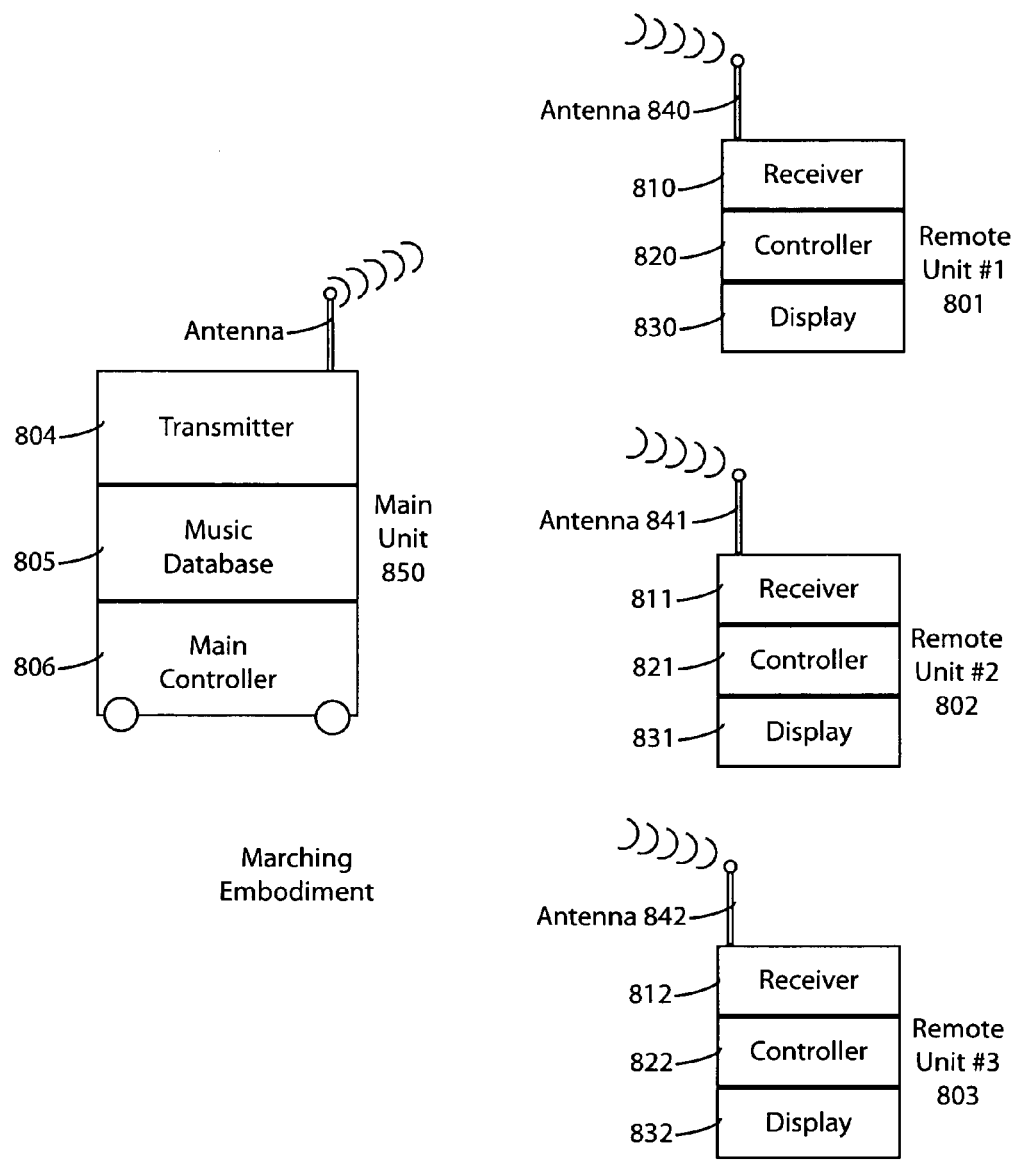
FIG. 8 shows a marching band environment in accordance with the present invention.

FIG. 8 illustrates an alternate embodiment of the present invention. In this embodiment, the workstations are remote units (801-803) used by a member of a marching band. Each of the remote units (801-803) are equipped with receivers (810-812) that receive musical compositions transmitted to them. Remote units controllers (820-822) control the operation of the remote unit (801-803). The musical composition is displayed on the remote unit's displays (830-832) which displays can be an LCD multiple line display providing low cost, low power usage, and high visibility/readability, and with Auto Advance Mode, the display automatically scrolls as the music is to be performed.

Each remote unit (801-803) can be mounted on the instrument on or in place of the lyre. The remote unit's antenna (840-842) can be separate from or built into the remote unit or the lyre.

A transportable main unit (850) is used to transmit musical compositions to the remote units (801-803). The transportable main unit (850) is comprised of a controller (806) for controlling the transportable main unit (850), a music database storage medium (805) containing the data for the musical compositions to be played by the band, and a transmitter (804) for transmitting the musical compositions to the remote units (801-803). This main unit can be in the form of a suitcase or briefcase size item. The main unit can also be provided built into a van that is driven around with the band or as a small self-contained portable unit. In accordance with this embodiment, the band can play a virtually unlimited number of musical compositions without the problem of carrying the music with them in paper form. It also relieves the band members of the problems of changing music and changing pages while marching. As discussed in the above embodiments, in the performance mode, the musical score is automatically scrolled across the screen display (830-832). Additionally, a keyboard and/or microphone can be attached to the transportable main unit allowing the conductor to send messages to the remote units via displays (830-832) or via a speaker associated with units (801-803). This allows the conductor to send instructions to the band (such as to take a certain route, or play at different volumes or speeds). With bidirectional communications and user performance feedback, the conductor can also monitor for errors.

FIG. 9 illustrates a conductor, stage hand, or other person with a sensor glove on each hand (935) and a head and eye movement monitor (930). The figure also illustrates the conductor wearing full body sensor equipment (940). Either embodiment or a combined embodiment can be used to map body movements. If only the gloves (935) or body sensors (944) are used, the movement of the glove or sensors can be captured by a video system, as illustrated in FIG. 10.

Other methods that capture motion rely on specialized sensors (944) placed on a performer's joints, such as via a sensor body suit (940). Once motion has been filmed or analyzed, a data set is produced to interpret that movement into Cartesian coordinates. These coordinates provide the spatial location of each of those markers. This information is then cleaned up and input to an animation package.

FIG. 10 illustrates a video camera (1005) and a standing conductor (1015) (or performing musician to be tracked or virtually linked to perform), with or without a blue screen (1010) behind him. The video camera (1005) feeds a video signal to the video processing system (1020) that utilizes signal processing to provide signal pattern recognition capability. The blue in the screen is filtered out in the signal processing such as by an Ultimatte process.

In one embodiment, the conductor is wearing a sensor equipped body suit (940) and gloves (935) of FIG. 9. In another embodiment, the conductor is wearing only the sensor equipped gloves (935) of FIG. 9. In still another embodiment, the conductor's movements are picked up by the video camera (1005) and processed without a sensor suit.

Simple things, like looking for the conductor's rapid hand movements, focusing on specific hand movement areas, facial and head movement, arm movements, and body language can all be programmed into the recognition knowledge base. Some of the technology for complete mapping of body movement that exists in making video games of today are illustrated in *Video Systems* magazine, page 42, October 1995, Vol. 21, No. 11, and *NEXT Generation* magazine, pages 49-54, October 1995, both incorporated herein by reference.

In any event, having now obtained knowledge related to recognition of the movements, the system can interpret them and utilize them to convey presentation information to the ensemble or orchestra or studio members, or to analyze a performer's movements, or to permit a virtual performance. One example would be a large screen television or multiple large screen televisions for viewing by the members of the viewing group. Alternatively, each music stand could provide for a picture in picture display of special movements of the conductor in areas of the display where music is not currently being played. Since the stand can have the intelligence to compare the performed music to the played music, that embodiment permits display of the message in portions of the music display area which have already been performed or are not going to be performed for some time (e.g., at least ten seconds in either direction; other criteria could alternatively be used, and can be set up for desired characteristics of the performing environment).

Voice recognition and response to conductor commentary can supplement the system. The system could record the message, interpret to whom the conductor directed the message and convey it audibly or translate it into a text or icon display as a part of the system's audiovisual presentation.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. In a network of computerized music display devices, a method for facilitating coinnmnication of a change to a musical composition from a first comptitenzed music display device of the network to one or more other computerized music display devices of the network, the one or more other computerized music display devices being for use by one or more players in a musical group, the method comprising:
    allowing a person, using the first computerized music display device, to enter the change to a portion of the musical composition;
    allowing the person to select, from among the one or more other computerized music display devices at least one of the other computerized music display devices which the changed portion of the musical composition is to be sent; and
    sending the changed portion of the musical composition to the selected one or more other computerized music display devices to be displayed.

2. The method of claim 1, wherein the changed portion represents edits to the musical composition which are displayed.

3. The method of claim 1, wherein allowing a person to enter the change comprises the first computerized music display device displaying at least a portion of the musical composition.

4. The method of claim 3, wherein allowing a person to enter the change comprises allowing the person to enter the change through a touch screen display device.

5. The method of claim 3, wherein allowing a person to enter the change comprises allowing the person to enter the change through a digitizer and electronic stylus.

6. Tbe method of claim 3, wherein allowing a person to enter the change comprises allowing the person to enter the change through at least one of a musical keyboard, a touch-screen device, a microphone, a video camera, an alphanumeric keyboards and an integrated musical-alphanumeric keyboard.

7. The method of claim 3, comprising displaying the changed portion on the first computerized music display device.

8. The method of claim 1, further comprising: allowing the person to select which part of the changed portion of the musical composition to send to the one or more other computerized music display devices to be displayed, prior to allowing the person to select from among the one or more other computerized music display devices.

9. The method of claim 1, wherein to the allowing the person to select from among the one or more other computerized music display devices cornprises the person touching a touch-screen device to select and to enable associated functions to provide for selectively sending the changed portion of the musical composition to the one or more other computerized music display devices to be displayed.

10. The method of claim 9, wherein the allowing the person to enter the change comprises the person touching the touch-screen device to selec from among the one or more other computerized music display devices comprises allowing the person to assign at least one of the one or more other computerized music display devices to at least one of a plurality of viewable user-actionable buttons, displayed on the touch-screen device.

11. The method of claim 10, wherein actuating one of the user-actionable buttons sends the changed portion to at least one of a single, a plurality, and all of the one or more other computerized music display devices.

12. The method of claim 1, wherein the one or more other computerized music display devices display the changed portion.

13. The method of claim 1, further comprising at lest temporarily recording the change.

14. The method of claim 13, comprising recording the change using a removable media storage device comprising at least one of a magnetic media removable recording device and an optical media removable recording device.

15. The method of claim 1, wherein the allowing the person to enter the changes, comprises the person touching a touch-screen to make edits so as to define the changed portion, the method further comprising:
    displaying at least the changed portion of the musical composition in a first display mode; and
    displaying the musical composition without the changed portion in a second display mode.

16. In a network of computerized devices each containing programming for displaying music on a display device, the computerized devices being used by each of a plurality of players in an orchestra under direction of a conductor, a method for facilitating leading of the orchestra, the method comprising:
    registering an identity of an instrument in use by each player and the corresponding computerized device being used by the player;
    receiving at a computerized device in use by the conductor a change to a musical arrangement, the conductor's computerized device comprising means for converting changes input via a touch-sensitive device to electronic format; and
    allowing the conductor to select whether the change is to be sent to all players in the orchestra or only to one or more players using an instrument impacted by the change;
    if the conductor selects to send the change only to the player or players using an instrument impacted by the change, determining which instrument or instruments are impacted by the change and identifying the corresponding computerized device or devices registered for that instrument; and
    transmitting the change to one or more players in accordance with the conductor's selections.

17. The method of claim 16, wherein the step of receiving the conductor's change comprises receiving the change through a touch screen display device.

18. The method of claim 16, comprising displaying the changes on the conductor's computerized device.

19. The method of claim 18, comprising displaying the changes on the player's computerized devices to which the changes are transmitted.

20. A graphical user interface system for a musical composition and orchestration system, the system comprising:
    means for allowing a first user to electronically input a change to a musical score displayed on a display device;
    means for allowing the first user to select whether the change is to be transmitted;
    means for allowing the user to select where to transmit the changes, to selected ones, or to all of a plurality of players in an orchestra or only to those one or more players playing an instrument affected by the change; and
    means for transmitting the change to the player or players in accordance with the first user's selections.

21. The system of claim 20, comprising a musical keyboard operatively coupled to a computer keyboard.

22. The system as in claim 20, wherein the means for allowing a first user to electronically input a change, is comprised of a touch-screen display device.

23. The system as in claim 20, wherein there is a plurality of the first users comprising at least one of the plurality of players, and
    wherein each of the first users has a separate one of the display devices.

24. In a network of computerized devices each containing programming for displaying music on a display device, the computerized devices being used by a plurality of players in an orchestra under direction of a conductor, a method for freilitating leading of the orchestra, the method comprising:
    receiving at a computerized device in use by the conductor a change to a musical arrangement input through a user-input device, the conductors computerized device comprising means for converting the changes from the user-input device into electronic format;
    allowing the conductor to select whether the change should be transmitted to at least one player of the plurality of players; and
    transmitting the change to the at least one player in accordance with the conductor's selection.

25. The method of claim 24, wherein the step of receiving the conductor's change comprises receiving the change through a touch screen display device.

26. The method of claim 24, wherein the step of receiving the conductor's change comprises receiving the change through a digitizer and electronic stylus.

27. The method of claim 24, comprising displaying the change on the conductor's computerized device.

28. The method of claim 24, comprising displaying the change on computerized devices of players to which the change is transtrutted.

29. The method of claim 24, comprising displaying the changes on the conductor's computerized device having a musical keyboard operatively coupled to a computer keyboard.

30. The method of claim 24, comprising displaying the change on the at least one player's computerized device having a musical keyboard operatively coupled to a computer keyboard.

31. A graphical user interface system for a musical composition and orchestration system, the system comprising:
    means for allowing a conductor to electronically input a change to a musical score displayed on a conductor's display device;
    means for allowing the conductor to select the written change for transmission of tbe change to at least one player; and
    means for transmitting the change to the at least one player in accordance with the conductor's selection.

32. The system of claim 31, wherein the conductor's display device comprises a musical keyboard operatively coupled to a computer keyboard.

33. The system of claim 31, comprising means for displaying the changes a display device of the at least one player, wherein the display device of the at least one player comprises a musical keyboard operatively coupled to a computer keyboard.

34. A computer usable medium storing program code which, when executed on a computerized device, causes the computerized device to execute, in, a network of computerized music display devices, a method for facilitating communication of a change to a musical composition from a first computerized music display device of the network to one or more other computerized music display devices of the network, the one or more other computerized music display devices being for use by one or more players in musical group, the method comprising:
    allowing a first user, using the first computerized music display device, to enter a plurality of changes to create the change to a portion of the musical composition;
    allowing the first user to select, from the plurality of changes of at least one of the changes to be the changed portion of the musical composition which is to be sent to the one or more other computerized music display devices; and
    sending the changed portion of the musical composition to the one or more other computerized music display devices.

35. The method of claim 34, wherein allowing the user to enter the change comprises the first computerized music display device displaying at least a portion of the musical composition.

36. The method of claim 34, further comprising: displaying the changed portion on the first computerized music display device.

37. The method of claim 34, further comprising: recording the change using a removable media storage device comprising at least one of a magnetic media removable recording device and an optical media removable recording device.

38. The method of claim 34, further comprising: displaying at least the changed portion of the musical composition in a first display mode; and
    in a second display mode, displaying the musical composition without the changed portion.

39. The method of claim 34, wherein the first computerized music display device is a master workstation, and
    wherein the other computerized music display devices are slave workstations.

40. The method as in claim 39, wherein anything displayed on the master workstation is also displayed on the slave workstations.

41. The method as in claim 34, further comprising:
    allowing the first user to select which of the one or more other computerized music display devices are selected to receive the sending of the changed portion; and
    sending the changed portion only to the selected ones of the one or more other computerized music display devices.

* * * * *

UNITED STATES PATENT AND TRADEMARK OFFICE
CERTIFICATE OF CORRECTION

| | | |
|---|---|---|
| PATENT NO. | : 7,297,856 B2 | |
| APPLICATION NO. | : 10/261061 | |
| DATED | : November 20, 2007 | |
| INVENTOR(S) | : David H. Sitrick | |

It is certified that error appears in the above-identified patent and that said Letters Patent is hereby corrected as shown below:

On the Title Page Item (60), "Related U.S. Patent Application Data" Field, lines 1-7, "Continuation of application Ser. No. 09/492,218 filed on Jan. 27, 2000, now U.S. Pat. No. 7,157,638, which is a division of application No. 09/039,952 filed Mar. 16, 1998, now Pat. No. 6,084,168, and a continuation of application No. 08/677,469, which is a continuation-in-part of application No. 08/677,469, filed on Jul. 10, 1996, now U.S. Pat. No. 5,728,960."

should read: --Continuation of application Ser. No. 09/492,218, filed Jan. 27, 2000, now U.S. Pat. No. 7,157,638, which is a divisional of application Ser. No. 09/039,952, now U.S. Pat. No. 6,084,168 filed Mar. 16, 1998, which is a continuation-in-part of application Ser. No. 08/677,469 now U.S. Pat. No. 5,728,960 filed Jul. 10, 1996.--

Column 1, lines 7-15,

"This application is a continuation of Ser. No. 08/677,469 now U.S. Patent No. 5,728,960 filed July 10, 1996, by virtue of this application being a continuation application of application Serial No. 09/492,218 filed January 27, 2000, now U.S. Pat. No. 7,157,638, which claims priority as a divisional of application Serial No. 09/039,952 filed March 16, 1998, which claims priority as a continuation-in-part of application Serial No. 08/677,469 now U.S. Patent No. 5,728,960 filed July 10, 1996."

should read: --This application is a continuation of application Ser. No. 09/492,218 filed Jan. 27, 2000, now U.S. Pat. No. 7,157,638, which is a divisional of application Ser. No. 09/039,952, now U.S. Pat. No. 6,084,168 filed Mar. 16, 1998, which is a continuation-in-part of application Ser. No. 08/677,469 now U.S. Pat. No. 5,728,960 filed Jul. 10, 1996.--

UNITED STATES PATENT AND TRADEMARK OFFICE
CERTIFICATE OF CORRECTION

PATENT NO. : 7,297,856 B2
APPLICATION NO. : 10/261061
DATED : November 20, 2007
INVENTOR(S) : David H. Sitrick It is certified that error appears in the above-identified patent and that said Letters Patent is hereby corrected as shown below:

On the Title Page Item (60), "Related U.S. Patent Application Data" Field, line 3, "division of application No. 09/039,952 filed Mar."

should read:

--Continuation of application Ser. No. 09/039,952, filed Mar.--

Column 1, line 11,

"No. 7,157,638, which claims priority as a divisional of"

should read:

--No. 7,157,638, which is a Continuation of--

Signed and Sealed this

Eleventh Day of November, 2008

JON W. DUDAS
*Director of the United States Patent and Trademark Office*